(12) United States Patent
Patakokila et al.

(10) Patent No.: US 11,706,332 B2
(45) Date of Patent: Jul. 18, 2023

(54) SMART NOTIFICATION SYSTEM FOR VOICE CALLS

(71) Applicant: QUALCOMM Incorporated, San Diego, CA (US)

(72) Inventors: Satish Babu Patakokila, Hyderabad (IN); Ramprasad Katkam, Hyderabad (IN); Dinesh Kumar Dommaraju, Tirupathi (IN); Venkata Leela Kiran Darisi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/314,996

(22) Filed: May 7, 2021

(65) Prior Publication Data

US 2021/0266399 A1    Aug. 26, 2021

Related U.S. Application Data

(63) Continuation of application No. 16/729,040, filed on Dec. 27, 2019, now Pat. No. 11,005,988.

(51) Int. Cl.
*H04M 1/82* (2006.01)
*H04M 3/428* (2006.01)

(52) U.S. Cl.
CPC .......... *H04M 1/82* (2013.01); *H04M 3/4286* (2013.01)

(58) Field of Classification Search
CPC .. H04M 1/247; H04M 1/724; H04M 1/72513; H04M 1/82; H04M 3/4286; H04M 7/1295; H04M 2250/74; H04M 1/2535; H04M 1/72409; H04M 1/72448; H04M 3/428; H04M 3/4285; H04M 3/4288; H04M 3/5238; H04M 3/523; G08B 5/36; H04W 4/16

See application file for complete search history.

(56) References Cited

U.S. PATENT DOCUMENTS

| | | | |
|---|---|---|---|
| 3,725,600 A | 4/1973 | Hutton | |
| 4,834,551 A | 5/1989 | Katz | |
| 4,899,381 A | 2/1990 | Lee | |
| 6,122,346 A | 9/2000 | Grossman | |
| 6,201,855 B1* | 3/2001 | Kennedy | H04M 1/80 379/33 |
| 6,219,415 B1* | 4/2001 | Deutsch | H04M 3/428 379/162 |

(Continued)

*Primary Examiner* — Gerald Gauthier
(74) *Attorney, Agent, or Firm* — Qualcomm Incorporated

(57) ABSTRACT

Systems, methods, and computer-readable media for providing smart notifications during voice call transitions from hold status to active status are described. An example method can include establishing a call between an endpoint and a remote device; after a determination that the call was placed on hold by the remote device, monitoring, by the endpoint, the call for an indication of a call resume transition, the indication of the call resume transition including at least one of a particular keyword transmitted by the remote device, an active speaker at the remote device, and a dual-tone multi-frequency signaling (DTMF) input from the remote device; detecting, by the endpoint, the indication of the call resume transition; and in response to detecting the indication of the call resume transition, generating, by the endpoint, a notification indicating that the hold has ended and the call has resumed.

30 Claims, 10 Drawing Sheets

(56) References Cited

U.S. PATENT DOCUMENTS

| | | | |
|---|---|---|---|
| 7,006,618 B1* | 2/2006 | Shaffer | H04M 1/2535 379/202.01 |
| 7,881,450 B1* | 2/2011 | Gentle | H04M 3/523 379/215.01 |
| 8,619,965 B1* | 12/2013 | Figa | H04M 3/4286 379/215.01 |
| 8,717,946 B2 | 5/2014 | Long et al. | |
| 9,380,159 B2* | 6/2016 | Iltus | H04M 1/72448 |
| 11,005,988 B1* | 5/2021 | Patakokila | H04M 1/82 |
| 2004/0136515 A1* | 7/2004 | Litwin, Jr. | H04M 3/428 379/202.01 |
| 2005/0069117 A1* | 3/2005 | Fernandez | H04M 3/4286 379/215.01 |
| 2005/0147227 A1* | 7/2005 | Chervirala | H04M 3/4286 379/215.01 |
| 2006/0154654 A1* | 7/2006 | Jabbour | H04M 3/428 455/417 |
| 2007/0121878 A1* | 5/2007 | Shaffer | H04M 7/0045 379/215.01 |
| 2007/0225030 A1* | 9/2007 | Teague | H04M 1/72513 455/414.1 |
| 2008/0317234 A1* | 12/2008 | Di Fabbrizio | H04M 3/4286 379/211.01 |
| 2009/0161859 A1 | 6/2009 | Erhart et al. | |
| 2010/0303227 A1* | 12/2010 | Gupta | H04M 1/247 379/266.06 |
| 2012/0163370 A1* | 6/2012 | Fiorante | H04M 3/4286 370/352 |
| 2014/0315524 A1* | 10/2014 | Sinha | H04M 3/4288 455/414.1 |
| 2015/0189089 A1* | 7/2015 | Lltus | H04W 4/16 379/266.06 |
| 2015/0341763 A1* | 11/2015 | Peterson | H04M 3/4285 455/414.1 |
| 2016/0021247 A1* | 1/2016 | Marimuthu | H04M 1/72409 455/414.1 |
| 2016/0191702 A1* | 6/2016 | Gabbai | H04M 3/4286 379/266.06 |
| 2020/0236214 A1* | 7/2020 | Mehta | G08B 5/36 |
| 2020/0259952 A1* | 8/2020 | Deole | H04M 3/4286 |
| 2020/0274965 A1* | 8/2020 | Ravichandran | H04M 3/4285 |
| 2020/0344351 A1* | 10/2020 | Xia | H04M 3/4286 |
| 2021/0266399 A1* | 8/2021 | Patakokila | H04M 1/82 |
| 2022/0046133 A1* | 2/2022 | Li | H04M 3/5238 |

* cited by examiner

SMART NOTIFICATION SYSTEM FOR VOICE CALLS

CROSS-REFERENCE TO RELATED APPLICATIONS

This application is a continuation of U.S. patent application Ser. No. 16/729,040 filed on Dec. 27, 2019, and entitled "SMART NOTIFICATION SYSTEM FOR VOICE CALLS", the contents of which are incorporated herein in their entirety and for all purposes.

TECHNICAL FIELD

The present disclosure generally relates to call and communication systems.

BACKGROUND

Phone systems have become a ubiquitous tool for remote users to communicate. Today, phone systems typically support a number of common features such as voice communications, video communications, call waiting, call hold, and conferencing, among others. Call hold allows a user to put an active call on hold, in which case the connection is not terminated but voice communications between the user and other users on the call are halted until the call is removed from hold. Virtually everyone who uses a telephone is familiar with call hold, as it is common practice for one party on a call to put another party on the call on hold to temporarily suspend or pause the call. For example, when a party, such as a user or business, is too busy to immediately answer an incoming call, the party often places the caller on hold until the party is able to continue with the call. As another example, if a party needs to temporarily suspend or pause a call to attend to something during the call, the party may place the call on hold until the party is able to resume the call.

When a user is placed on hold, the user can often listen to music, messages, and/or advertisements provided to the user while the call is on hold. In other cases, when a user is placed on hold, the line may remain silent as the user awaits for the call to resume. Typically, while the call is on hold, the user placed on hold has to wait indefinitely and continuously monitor the call to know when the call has resumed. If the user on hold becomes distracted or steps away from the call, the user may not detect that the call has resumed, which in many cases can lead the party at the other end of the call to believe the user on hold did not wait for the call to resume and inadvertently terminate the call. Frequently, as the user on hold continues to monitor the call and awaits for the call to resume, the user becomes impatient and terminates the call before the call is resumed. The time spent by the user on hold monitoring the call and waiting for the call to resume can often feel wasteful or burdensome to the user.

BRIEF SUMMARY

In some examples, systems, methods, and computer-readable media are described for providing smart notifications during voice call transitions from a hold status to an active status. According to at least one example, a method is provided for generating smart notifications during voice call transitions. The method can include establishing a call between an endpoint and a remote device; determining the call is placed on hold by the remote device; monitoring, by the endpoint based on the call being placed on hold, the call for an indication of a call resume transition, the indication of the call resume transition including a particular keyword transmitted by the remote device, an active speaker at the remote device, and/or a dual-tone multi-frequency signaling (DTMF) input from the remote device; detecting, by the endpoint, the indication of the call resume transition; and in response to detecting the indication of the call resume transition, generating, by the endpoint, a notification indicating that the hold has ended and the call has resumed.

In another example, an apparatus is provided for generating smart notifications during voice call transitions. The apparatus can include a memory and a processor coupled to the memory, the processor configured to establish a call with a remote device; determine the call is placed on hold by the remote device; monitor, based on the call being placed on hold, the call for an indication of a call resume transition, the indication of the call resume transition including a particular keyword transmitted by the remote device, an active speaker at the remote device, and/or a dual-tone multi-frequency signaling (DTMF) input from the remote device; detect the indication of the call resume transition; and in response to detecting the indication of the call resume transition, generate a notification indicating that the hold has ended and the call has resumed.

In another example, a non-transitory computer-readable medium is provided for generating smart notifications during voice call transitions. The non-transitory computer-readable medium can include instructions which, when executed by one or more processors, cause the one or more processors to establish a call with a remote device; determine the call is placed on hold by the remote device; monitor, based on the call being placed on hold, the call for an indication of a call resume transition, the indication of the call resume transition including a particular keyword transmitted by the remote device, an active speaker at the remote device, and/or a dual-tone multi-frequency signaling (DTMF) input from the remote device; detect the indication of the call resume transition; and in response to detecting the indication of the call resume transition, generate a notification indicating that the hold has ended and the call has resumed.

In another example, an apparatus including means for generating smart notifications during voice call transitions. The apparatus can include means for establishing a call with a remote device; determining the call is placed on hold by the remote device; monitoring, based on the call being placed on hold, the call for an indication of a call resume transition, the indication of the call resume transition including a particular keyword transmitted by the remote device, an active speaker at the remote device, and/or a dual-tone multi-frequency signaling (DTMF) input from the remote device; detecting the indication of the call resume transition; and in response to detecting the indication of the call resume transition, generating a notification indicating that the hold has ended and the call has resumed.

In some examples, the notification in the method, non-transitory computer-readable medium, and apparatuses described above can include an audio notification and/or a visual notification. Moreover, in some examples, generating the notification can include outputting the audio notification and/or the visual notification.

In some aspects, the method, non-transitory computer-readable medium, and apparatuses described above can include receiving, by the endpoint, an input requesting to initiate a hold monitoring mode at the endpoint; initiating, by the endpoint, the hold monitoring mode in response to the input; and monitoring, by the endpoint, the call during the hold monitoring mode for the indication of the call resume transition. In some examples, the hold monitoring mode can trigger the endpoint to monitor the call and generate the notification based on the detecting of the indication of the call resume transition.

In some aspects, the method, non-transitory computer-readable medium, and apparatuses described above can include receiving, by the endpoint, a communication from the remote device, the communication including one or more utterances, wherein the communication is received after the call being placed on hold by the remote device; recognizing, by the endpoint using automatic speech processing, speech corresponding to the one or more utterances, the speech including one or more words; and detecting, by the endpoint, the particular keyword and/or the active speaker at the remote device based on the recognized speech. In some examples, the particular keyword can include a predefined word identified as a call resume transition keyword, and detecting the particular keyword and/or the active speaker can include determining that at least one of the one or more words matches the predefined word.

In some aspects, the method, non-transitory computer-readable medium, and apparatuses described above can further include receiving, by the endpoint, a different communication from the remote device, the different communication including music played on the call, wherein the different communication is received while the call is on hold and before receiving the communication including the one or more utterances; detecting, by the endpoint, a transition from music played on the call to the active speaker, wherein the call resume transition includes the transition from the music played on the call to the active speaker; and determining, by the endpoint, that the call has transitioned from a hold to a resume state based on the detected transition from music played on the call to the active speaker.

In some aspects, the method, non-transitory computer-readable medium, and apparatuses described above can include receiving, by the endpoint, a first communication from the remote device, the first communication comprising one or more utterances; identifying, by the endpoint, one or more voice characteristics associated with the one or more utterances; receiving, by the endpoint, a second communication from the remote device, the second communication including one or more additional utterances, wherein the second communication is received after the call being placed on hold by the remote device; determining, by the endpoint, whether one or more additional voice characteristics associated with the one or more additional utterances match the one or more voice characteristics associated with the one or more utterances; and detecting, by the endpoint, the active speaker at the remote device based on a match between the one or more additional voice characteristics associated with the one or more additional utterances and the one or more voice characteristics associated with the one or more utterances. In some examples, the one or more voice characteristics associated with the one or more utterances and the one or more additional voice characteristics associated with the one or more additional utterances can include a pitch, a volume, a tone, a vocal range, an inflection, a speech rate, vocal resonation, one or more breathing noises, an intensity, an accent, and/or a speech pattern.

In some aspects, the method, non-transitory computer-readable medium, and apparatuses described above can further include receiving, by the endpoint, a third communication from the remote device, the third communication comprising music played on the call, wherein the third communication is received while the call is on hold and before the second communication; based on the first communication, the second communication, and the third communication, detecting, by the endpoint, a first transition from a voice communication to music played on the call and a second transition from the music played on the call to the active speaker, wherein the call resume transition includes the second transition from the music played on the call to the active speaker; and determining, by the endpoint, that the call has transitioned from a hold to a resume state based on the second transition from music played on the call to the active speaker.

In some aspects, the method, non-transitory computer-readable medium, and apparatuses described above can include detecting, by the endpoint, that the remote device has placed the call on hold, the endpoint detecting that the remote has placed the call on hold based on a recognized keyword uttered by a first speaker at the remote device, a lack of communications received from the remote device for a period of time, and/or one or more utterances associated with a second speaker at the endpoint.

In some aspects, the method, non-transitory computer-readable medium, and apparatuses described above can include determining, by the endpoint, that a user associated with the endpoint has moved away from the endpoint; determining, by the endpoint, that the user is within a proximity of a wireless device having audio capabilities and/or display capabilities; and sending, by the endpoint to the wireless device, an instruction to output, via the audio capabilities and/or the display capabilities, the notification indicating that the hold has ended and the call has resumed.

In some aspects, the apparatuses described above can include the one or more sensors. In some examples, the apparatuses described above can include a mobile phone, a conference system, a telephone system, a wearable device, a display device, a mobile computer, a head-mounted display, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1A:
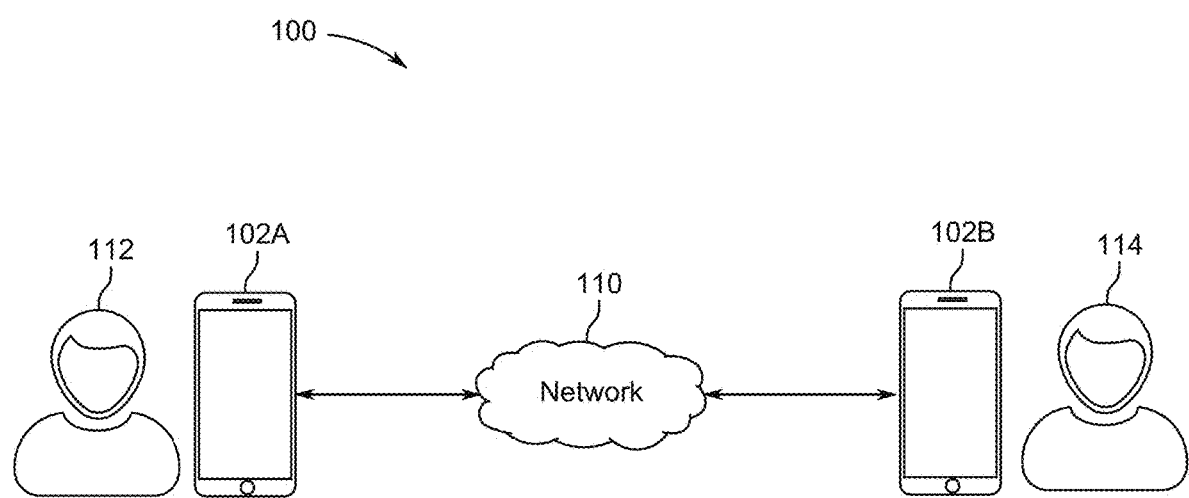
FIG. 1A illustrates an example voice call between users, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, when a remote participant of a call places the call on hold, the other participant(s) on the call generally have to wait indefinitely and continuously monitor the call to know when the call has resumed. If a participant waiting for the call on hold to resume becomes distracted or steps away from the call, the participant may not detect when the call has resumed, which in many cases can lead the remote participant at the other end of the call to believe the participant on hold did not wait for the call to resume. Consequently, the remote participant may inadvertently terminate the call. Frequently, as the participant on hold continues to monitor the call and waits for the call to resume, the participant becomes impatient and terminates the call before the call is resumed. The time spent by the participant on hold monitoring the call and waiting for the call to resume can often feel wasteful or burdensome to the participant.

The technologies herein can allow the endpoint of a participant on a call to monitor the call while the call is on hold and automatically detect when the call is resumed (e.g., when the call transitions from a hold state to a resume state). The endpoint can then generate an alert to inform the participant that the call has resumed. This way, the participant does not have to continuously monitor the call and has added flexibility to move away from the endpoint to perform other tasks until the call is resumed. If the participant has moved away from the endpoint after the call was placed on hold and is delayed in returning to the call after the call is resumed, the endpoint can notify the remote participant that the participant is delayed but will return shortly. This can avoid any confusion by the remote participant that may lead the remote participant to conclude that the other participant did not wait for the call to resume and inadvertently terminate the call before the other participant is able to return to the call after having moved away from the endpoint. In some cases, the endpoint of the other participant can detect that the participant has moved away from the endpoint and route any notifications to a nearby device that is closer to the participant and/or likely to better reach the participant while away.

Figure 7:
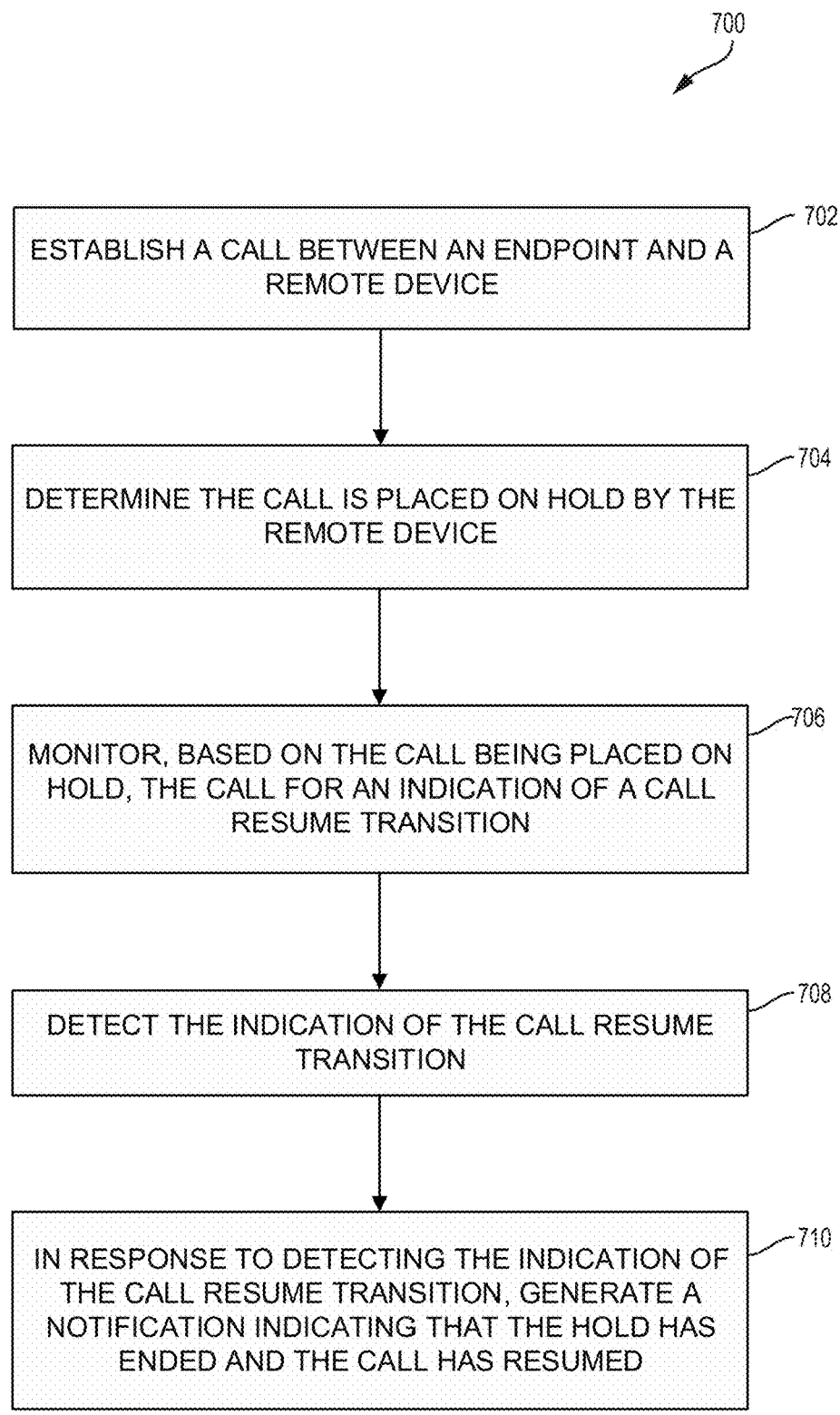
FIG. 7 illustrates an example method for providing smart notifications during voice call transitions from a hold status to an active status, in accordance with some examples of the present disclosure.
Figure 8:
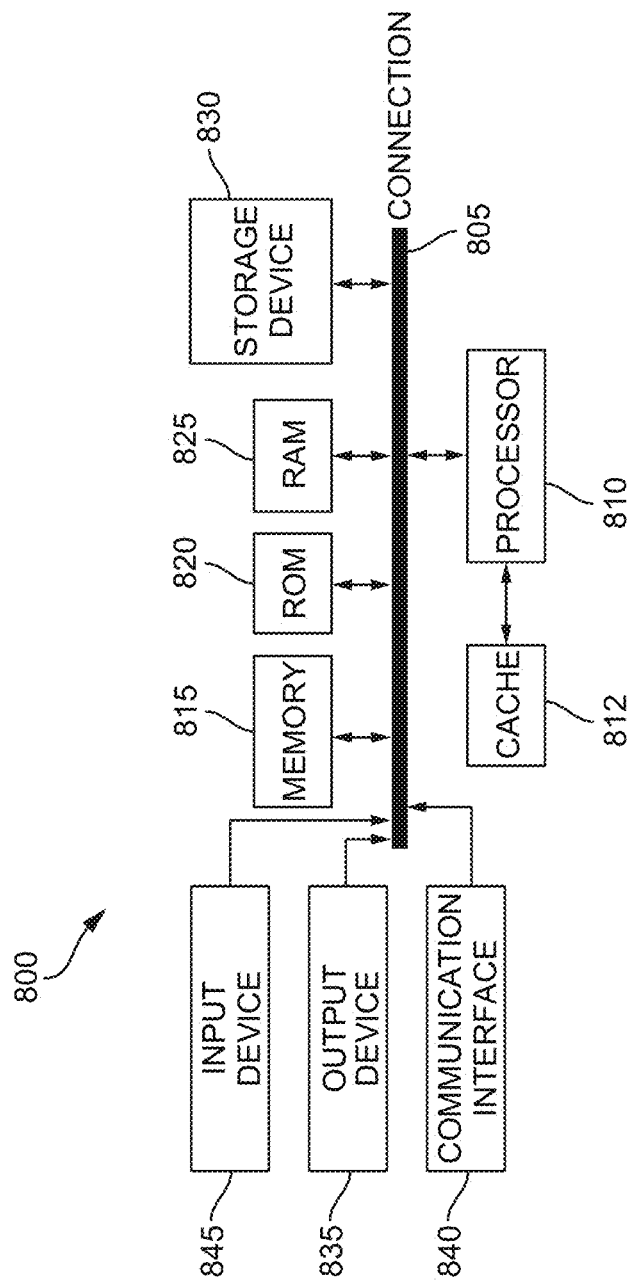
FIG. 8 illustrates an example computing device architecture, in accordance with some examples of the present disclosure.

The present technology will be described in the following disclosure as follows. The discussion begins with a description of example systems, architectures, and technologies for providing smart notifications during voice call transitions, as illustrated in FIGS. 1A through 6. A description of an example method for providing smart notifications during voice call transitions, as illustrated in FIG. 7, will then follow. The discussion concludes with a description of an example computing device architecture including example hardware components suitable for implementing a smart notification or alert system during voice call transitions, as illustrated in FIG. 8. The disclosure now turns to FIG. 1A.

FIG. 1A illustrates an example voice call 100 between users 112 and 114. The voice call 100 can include and/or support one or more call features such as, for example, audio, video, call hold, call waiting, conferencing, interactive voice response (IVR), dual-tone multi-frequency signaling (DTMF), screen sharing, side chats, and/or any other call features.

User 112 can communicate with user 114 on the voice call 100 via endpoint 102A, and user 114 can communicate with user 112 via endpoint 102B. Each of the endpoints 102A-B can include any computing device or phone system such as, for example, a smartphone, a smart wearable device (e.g., a smart watch, smart goggles), a smart television, a game system, a tablet computer, an IP (Internet Protocol) phone, a laptop computer, a car phone, a desk phone, an IoT (Internet-of-Things) device, etc.

The endpoints 102A-B can support voice/audio and call hold. The endpoints 102-B can also support DTMF, automatic speech processing (ASR), keyword detection, and/or active speaker detection, as described herein. In some examples, the endpoints 102A-B can support one or more other call and/or multimedia features such as, for example, call conferencing, call waiting, video, voicemail, and/or any other call or multimedia features.

The endpoints 102A-B can establish the voice call 100 via network 110. Network 110 can represent one or more public and/or private networks. Moreover, network 110 can include, for example, a public switched telecommunications network (PTSN), a wireless network (e.g., a cellular network, a wireless local area network, a satellite communication network, a microwave network, etc.), an IP network, a call provider network, a cloud network hosting call and/or conferencing services, an integrated services digital network (ISDN), a virtual network, a telephone operator network, a landline network, and/or any other type of network.

In some examples, a particular user (e.g., user 112 or user 114) can place the voice call 100 and the other user on hold for a period of time. The user can place the voice call 100 on hold by activating a hold feature on the user's endpoint (e.g., endpoint 102A or 102B). The user can activate such hold feature by pressing a key on the user's endpoint, by providing an input through a touch screen on the user's endpoint, through a voice command, and/or any other input mechanism. When the user places the voice call 100 on hold, the voice call 100 connection is not terminated but the call is suspended such that the users 112 and 114 will not be able to communicate with each other through the voice call 100 until the hold is terminated and the voice call 100 is resumed. In some examples, when the voice call 100 is placed on hold, the line can become silent and the user on hold in the voice call 100 can wait in silence for the call to resume.

In other examples, when the voice call 100 is placed on hold, the endpoint of the user on hold can receive audio during the hold period. The user on hold can thus receive audio transmitted through the voice call 100 as the user waits for the call to resume. The audio transmitted through the voice call 100 while the user is on hold can include, for example, music, advertisements, messages/notifications, updates, etc. Moreover, in some cases, the user that placed the voice call 100 on hold can resume the voice call 100 temporarily and return the voice call 100 to a hold status thereafter. For example, user 112 can place the voice call 100 on hold for a period of time, temporarily resume the call to thank the user 114 on hold for being patient and provide a message or status update to the user 114 prior to placing the voice call 100 on hold again for another period of time.

When a user (e.g., user 112 or 114) is on hold, the user can activate a hold monitoring function on the user's endpoint (e.g., endpoint 102A or 102B), as further described herein. The hold monitoring function can allow the user's endpoint to monitor the voice call 100 to detect when the voice call 100 is resumed in order to alert the user that the call has resumed. This can allow the user on hold to avoid having to continuously monitor the voice call 100 manually, thus enabling the user on hold to move away from the user's endpoint, become distracted with other things, and/or do other things without having to simultaneously listen on the user's endpoint for the call to resume.

Figure 1B:
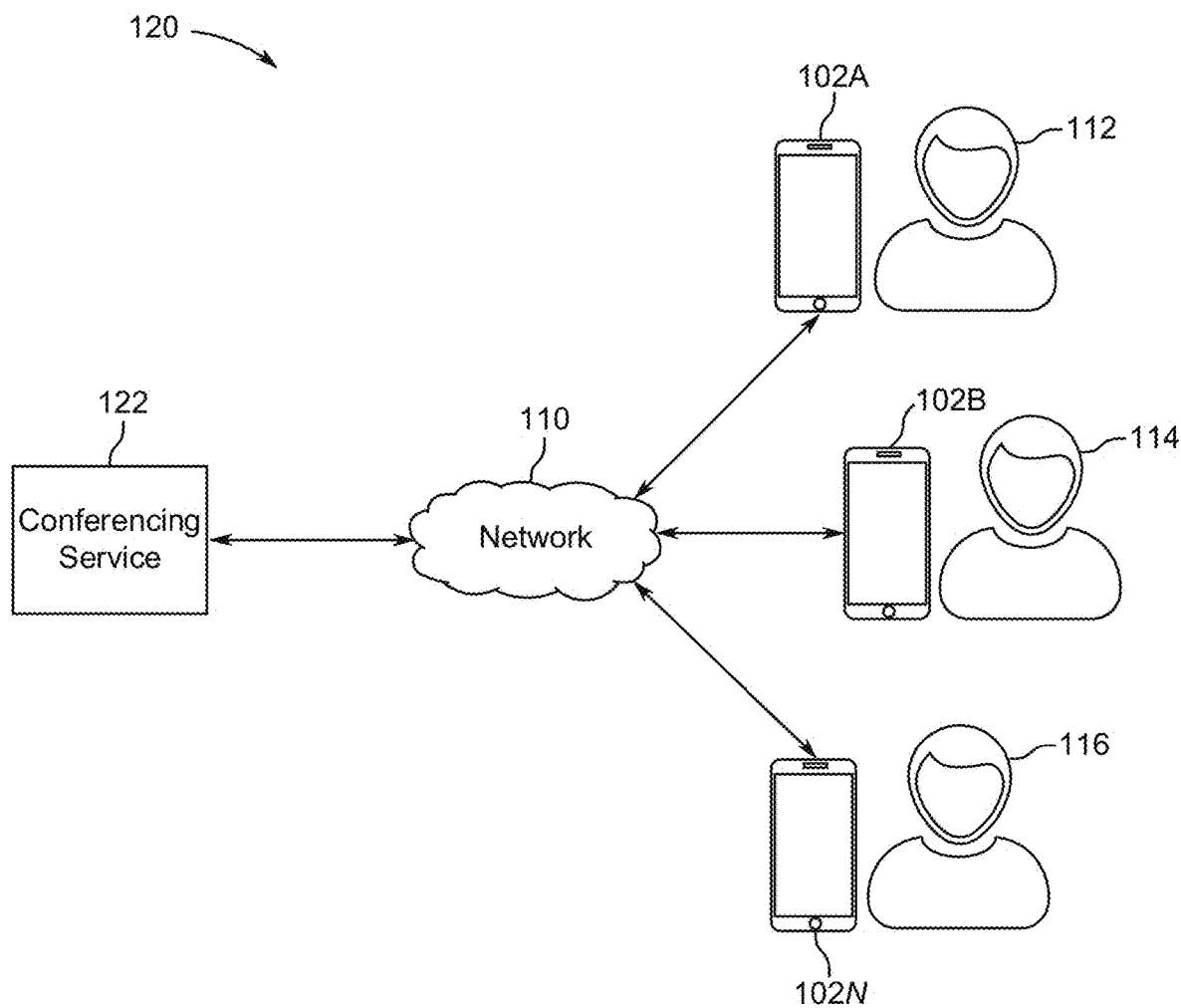
FIG. 1B illustrates an example conference call between users, in accordance with some examples of the present disclosure.

FIG. 1B illustrates an example conference call 120 between users 112-116. The conference call 120 can include and/or support one or more call features such as, for example, audio, video, call hold, voice messaging, call waiting, IVR, DTMF, screen sharing, call recording, and/or any other call features. In some examples, the conference call 120 can include and/or support other features such as, for example, content sharing, instant messaging, desktop or screen sharing, chat, presence sharing, and/or other types of media and communications.

The users 112-116 can communicate with each other on the conference call 120 using their respective endpoints 102A-N. Each of the endpoints 102A-N can include any computing device or phone system and can support a number of call features as previously described with respect to FIG. 1A. The endpoints 102A-N can connect to the conference call 120 via network 110. In some examples, the conference call 120 can be hosted and managed by a conferencing service 122.

The conferencing service 122 can manage various aspects of the conference call 120, such as content, communications, data, state, settings, functionality, routing, bridging, etc. In some examples, the conferencing service 122 can host concurrent conferences, persistent conferences, and any other types or combinations of conferences. The conferencing service 122 can host one or more conferences at any time or period (e.g., an hour, a day, a week, a month, etc.), with respective participants connecting via their endpoints from different geographic locations, networks, etc. In some cases, the number and/or type of participants in the conference call 120 can vary and may change dynamically. For example, the number of participants in the conference call 120 can change during the conference call 120, as participants may dynamically join or leave the conference.

The conferencing service 122 can include one or more servers, bridges, server applications, cloud services, routers, conference bridges, gateways, multipoint control units, conference applications, etc. Moreover, the infrastructure of the conferencing service 122 can vary in different deployments. For example, the conferencing service 122 can be deployed via an on-premises conferencing infrastructure for an organization or enterprise, as a cloud-based service hosted on one or more cloud computing environments or data centers, in a hybrid infrastructure including an on-premises conferencing infrastructure and cloud-based service, etc. In some cases, the conferencing service 122 can be a cloud-based conferencing service or infrastructure.

The conferencing service 122 can support different conferencing clients/endpoints and technologies. For example, the conferencing service 122 can support SIP (session initiation protocol) endpoints, H.323 videoconferencing endpoints, video participants, audio-only participants, VoIP (Voice over Internet Protocol) endpoints, PSTN endpoints, etc. In some examples, the endpoints 102A-N can run specific software which enables users 112-116 to participate in the conference call 120 hosted by the conferencing service 122. For example, the users 112-116 can use a conferencing application running at the endpoints 102A-N to join and participate in the conference call 120 hosted by the conferencing service 122. The conferencing application can function as a conference client at the endpoints 102A-N. The conferencing application can be a native client application configured specifically for conferences hosted by the conferencing service 122, a web browser or browser plugin/component/application having specific functionalities for web conferencing, a client application that supports one or more conferencing technologies or protocols, or any other software application suitable for conferencing.

In some examples, the endpoints 102A-N and/or a conferencing application on the endpoints 102A-N can include various tools and capabilities (including software and/or hardware), for conferencing, such as network capabilities, video capabilities, audio capabilities, compression capabilities, NAT/Firewall traversal capabilities, one or more codecs, and so forth. Non-limiting examples of technologies that can be used by the endpoints 102A-N and/or a conferencing application on the endpoints 102A-N to participate, create or establish, manage, or otherwise support the conference call 120 hosted on the conferencing service 122 include SIP, H.263, H.264, H.264 High-Profile, H.264 SVC (SSL VPN client), H.239, H.320, H.323 SIP, VoIP, G.711, G.722, G.729, T.120, VP8, RTP, TCP/IP, HD video conferencing, remote frame buffer protocol, real-time protocol, and so forth.

In some examples, the conferencing service 122 or a particular user (e.g., user 112, 114, or 116) can place the conference call 120 on hold for a period of time. The conferencing service 122 or the particular user can place the conference call 120 on hold by activating a hold feature as previously explained with respect to FIG. 1A. When the conference call 120 is placed on hold, the conference call 120 connection is not terminated but the conference call 120 is suspended such that the users 112, 114 and 116 will not be able to communicate with each other through the conference call 120 until the hold is terminated and the conference call 120 is resumed. In some examples, when the conference call 120 is placed on hold, the line can become silent and the user(s) on hold in the conference call 120 can wait in silence for the conference call 120 to resume.

In other examples, when the conference call 120 is placed on hold, the endpoint of each user on hold can receive audio during the hold period (e.g., from the conferencing service 122). Each user on hold can thus receive audio transmitted through the conference call 120 as the user waits for the call to resume. The audio can include, for example, music, advertisements, messages/notifications, updates, etc. When a user (e.g., user 112, 114 and/or 116) is on hold, the user can activate a hold monitoring function on the user's endpoint (e.g., endpoint 102A, 102B, or 102N), as further described herein.

Figure 1C:
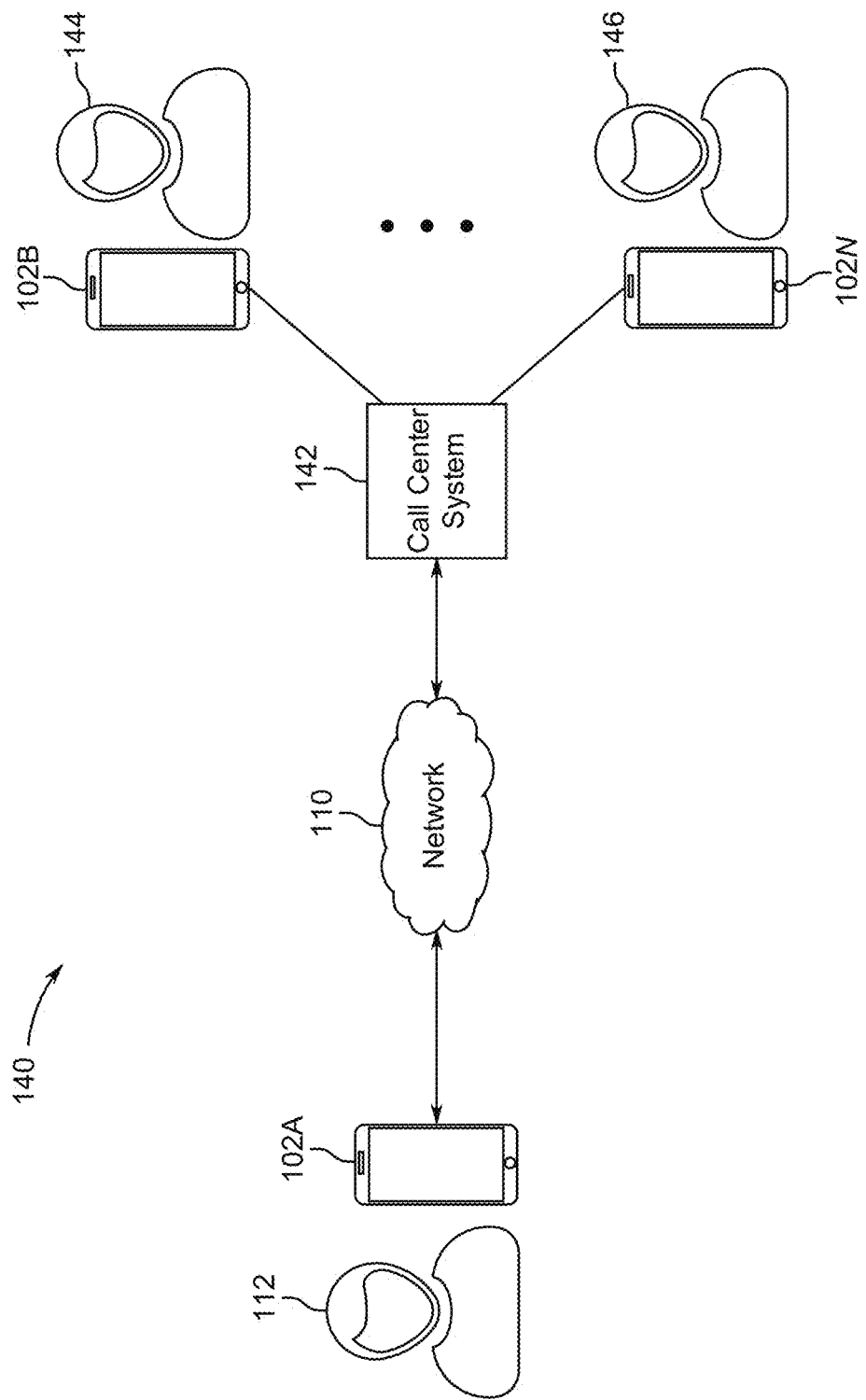
FIG. 1C illustrates an example call center call, in accordance with some examples of the present disclosure.

FIG. 1C illustrates an example call center call 140. In this example, user 112 can use endpoint 102A to establish a call center call 140 with one or more call center agents 144-146. The call center agents 144-146 can join and communicate on the call center call 140 from their endpoints 102B-N. In some examples, the call center agents 144-146 can be human agents communicating from their endpoints 102B-N. In other examples, the call center agents 144-146 can be software agents or bots configured to recognized speech received from the endpoint 102 of the user 112 and provide computer-generated speech (e.g., computer-generated responses and/or questions).

The user 112 can establish the call center call 140 through a call center system 142. The call center system 142 can provide various call center features such as, for example, IVR, call routing, call logging, multi-channel communications, predictive dialing, automatic dialer, call queuing, call recording, call control, speech processing, call hold, voice recognition, DTMF, etc. The user 112 can connect to the call center system 142 from endpoint 102A via the network 110. The call center system 142 can route an incoming call from the endpoint 102A to the endpoint 102B or 102N of a specific call center agent (e.g., 144 or 146).

In some examples, the call center system 142 can provide the user 112 a menu of options to allow the user 112 to provide information that the call center system 142 can use to better identify which call center agent to route the call from the user 112 to. The user 112 can select specific options or provide inputs by pressing a key on the endpoint 102A and/or through a voice utterance. The call center system 142 can receive such inputs from the user 112 and analyze the inputs to determine which call center agent to route the call to. In some examples, the call center system 142 can identify a specific key pressed by the user 112 on the endpoint 102A and/or recognize any speech provided by the user 112 to determine how to route the call.

In some cases, prior to (and/or while) routing the call from the user 112 to a particular call center agent and/or connecting the call from the user 112 with a particular call center agent, the call center system 142 can place the call on hold. The user 112 can then await for the call to resume once a call center agent is available and joins the call. In some cases, the call center system 142 can place the call from the user 112 in a queue of calls/users and route the call from the user 112 to a call center agent when the user 112 or the call from the user 112 reaches the top of the queue.

In some examples, when the user 112 is routed to a call center agent (e.g., call center agent 144 or 146), the user 112 can be placed on hold by the call center agent. For example, the user 112 can be placed on hold by a call center agent if the call center agent needs to pause the call to do something or if the call center agent needs to reroute the user 112 to a different call center agent.

When the user 112 is placed on hold, the call center call connection is not terminated but the call center call 140 is suspended such that the user 112 will not be able to communicate through the call center call 140 with the call center agent on the other end until the hold is terminated and the call center call 140 is resumed or rerouted. In some examples, when the call center call 140 is placed on hold, the line can become silent and the user 112 on hold in the call center call 140 can wait in silence for the call to resume.

In other examples, when the call center call 140 is placed on hold, the endpoint 102A of the user 112 on hold can receive audio during the hold period. The user 112 on hold can thus receive audio transmitted through the call center call 140 as the user 112 waits for the call to resume. The audio transmitted through the call center call 140 while the user 112 is on hold can include, for example, music, advertisements, messages/notifications, updates, etc. When the user 112 is on hold, the user 112 can activate a hold monitoring function on the endpoint 102 of the user 112, as further described herein. The hold monitoring function can allow the endpoint 102A to monitor the call center call 140 to detect when the call center call 140 is resumed in order to alert the user 112 that the call has resumed.

Figure 2:
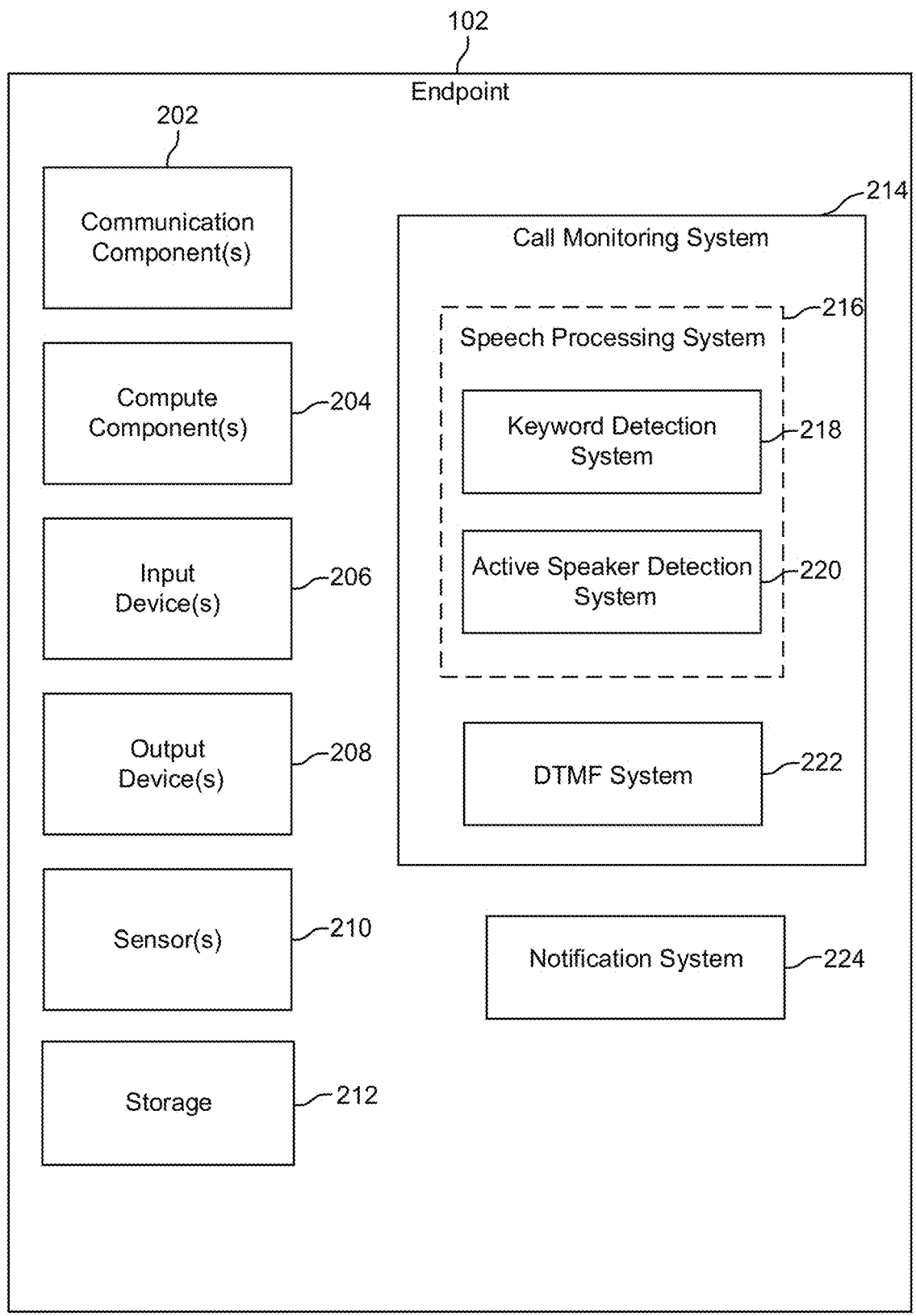
FIG. 2 illustrates an example architecture of an endpoint that can implement a hold monitor feature when the endpoint is placed on hold during a call, in accordance with some examples of the present disclosure.

FIG. 2 illustrates an example architecture of an endpoint 102 that can implement a hold monitor feature when the endpoint 102 is placed on hold during a call (e.g., voice call 100, conference call 120, call center call 140). The endpoint 102 can represent any of the endpoints 102A, 102B, and/or 102N shown in FIGS. 1A-C.

The endpoint 102 can include any computing device or phone system capable of establishing a voice call and participating in the voice call. For example, the endpoint 102 can include a smartphone, a smart wearable device (e.g., a smart watch, smart goggles), a smart television, a game system, a tablet computer, an IP phone, a laptop computer, a car phone, a desk phone, an IoT device, or any other communication device capable of participating on a voice call. The endpoint 102 can support voice/audio and a call hold monitoring feature as further described herein.

In the example shown in FIG. 2, the endpoint 102 can include one or more communication components 202, one or more compute components 204, one or more input devices 206, one or more output devices 208, one or more sensors 210, a storage 212, a call monitoring system 214, a speech processing system 216, a keyword detection system 218, an active speaker detection system 220, a DTMF system 222, and a notification system 224. While the endpoint 102 is shown to include certain components, one of ordinary skill in the art will appreciate that the endpoint 102 can include more or fewer (and/or different) components than those shown in FIG. 2. For example, the endpoint 102 can include, in some instances, one or more memory devices (e.g., RAM, ROM, cache, and/or the like), one or more cameras, and/or any other hardware or processing devices that are not shown in FIG. 2. An illustrative example of a computing device and hardware components that can be implemented with the endpoint 102 is described below with respect to FIG. 8.

In some examples, the one or more communication components 202 can include a cellular antenna for communicating over cellular networks, a WIFI antenna for communicating over a wireless local area network (WLAN), a network interface for connecting the endpoint 102 to a data network (e.g., wired and/or wireless network), and/or an interface component for connecting the endpoint 102 to a telephone landline. In some cases, the one or more communication components 202 can also include other antennas or communication interfaces such as, for example, a Bluetooth antenna, a GPS antenna, and/or any other suitable hardware component for sending and/or receiving wired and/or wireless signals. The endpoint 102 can use the one or more communication components 202 to establish, and participate in, a voice call (e.g., 100, 120, 140). The endpoint 102 can also use the one or more communication components 202 to send and receive data from other devices.

The one or more compute components 204 can include a central processing unit (CPU), a graphics processing unit (GPU), a digital signal processor (DSP), an image signal processor (ISP), an application-specific integrated circuit (ASIC), a controller device, and/or any other processing device. The one or more compute components 202 can perform various operations and can manage/control other components on the endpoint 102, including the one or more communication components 202, the one or more input devices 206, the one or more output devices 208, the one or more sensors 210, and the storage 212. Moreover, the compute components 204 can implement the call monitoring system 214, the speech processing system 216, the keyword detection system 218, the active speaker detection system 220, the DTMF system 222, and/or the notification system 224. In some examples, the compute components 204 can also implement one or more other processing engines.

The one or more input devices 206 can include a keypad, a touch screen, a microphone, an image sensor, a controller, a keyboard, a pointing device, and/or any other input device capable of receiving a user input in any modality of input (e.g., mechanical motion, audio, visual, etc.). A user can use the one or more input devices 206 to manage a call (e.g., initiate the call, terminate the call, place the call on hold, etc.), interact with the endpoint 102, provide inputs, and activate and/or manage one or more features and/or controls, such as a hold monitoring feature, a mute function, a record function, volume controls, endpoint settings, call settings, etc.

The one or more output devices 208 can include a speaker. In some examples, the one or more output devices 208 can also include a display and/or component capable of outputting data. For example, in some cases, the one or more output devices 208 can include a touch screen capable of displaying content and receiving user inputs.

The one or more sensors 210 can include, for example, an inertial measuring unit (IMU), an image sensor (e.g., camera sensor), an accelerometer, a gyroscope, a magnetometer, an altimeter, a tilt sensor, a motion detection sensor, a light sensor, an audio sensor, a light detection and ranging (LIDAR) device, a proximity sensor, an orientation sensor, and/or any other sensor. The one or more sensors 210 can be used to detect an object, detect a location of an object, detect one or more conditions (e.g., light, motion, etc.), capture data (e.g., image data, audio, etc.), measure one or more characteristics of an object or environment (e.g., orientation, shape, size, state, etc.), collect specific types of measurements, etc.

The storage 212 can be any storage device(s) for storing data, such as image data, files, software, videos, text data, messages, device/component profiles, user profiles, audio profiles, settings, user inputs, network data, etc. Moreover, the storage 212 can store data from any of the components of the endpoint 102. For example, the storage 212 can store data from the one or more communication components 202, the one or more compute components 204, the one or more input devices 206, the one or more output devices 208, the one or more sensors 210, the call monitoring system 214, the speech processing system 216, the keyword detection system 218, the active speaker detection system 220, the DTMF system 222, and the notification system 224.

The call monitoring system 214 can implement a hold monitor feature which allows the call monitoring system 214 to place the endpoint 102 in a hold monitoring mode when the endpoint 102 is put on hold during a call. When operating in hold monitoring mode, the call monitoring system 214 can monitor the call while on hold and detect when the call is resumed. When the call monitoring system 214 detects that the call has resumed, the call monitoring system 214 can trigger an alert via the notification system 224, which can inform the user that the call has resumed. Such an alert can allow the user to know when the call has resumed without having to continuously monitor the call manually or place the call on speaker which may disturb others and can force the user to remain within a more limited proximity to the endpoint 102.

In some examples, the call monitoring system 214 can activate the hold monitoring mode based on a user input requesting to activate the hold monitoring mode. For example, the user can press a key on the endpoint 102 or provide a voice command to activate the hold monitoring mode. The call monitoring system 214 can detect the pressed key or voice command and trigger the hold monitoring mode. In other examples, the call monitoring system 214 can activate the hold monitoring mode automatically after the call is placed on hold. For example, the call monitoring system 214 can detect certain keywords/utterances communicated in the call, a lack of speech or sound for a configurable period of time, and/or a lack of activity on the call and automatically determine that the call has been placed on hold. The call monitoring system 214 can then trigger the hold monitoring mode or generate a message (e.g., a textual, visual, and/or audio message) asking the user to confirm that the call monitoring system 214 should trigger the hold monitoring mode.

To monitor the call and detect a call state (e.g., on hold, call resumed, etc.), the call monitoring system 214 can implement the speech processing system 216, the keyword detection system 218, the active speaker detection system 220 and/or the DTMF system 222. The speech processing system 216 can detect, process and recognize human speech or natural language. The speech processing system 216 can use the processed speech to determine if a call has resumed from hold by detecting an active speaker on the call and/or detecting certain keyword utterances on the call. In some examples, the speech processing system 216 can implement a keyword detection system 218 to detect certain keyword utterances and an active speaker detection system 220 to detect an active speaker on the call.

In some examples, the speech processing system 216 can include an automatic speech recognition engine that can analyze speech input and recognize the speech and/or the semantic meaning of the speech in the speech input. In some cases, the automatic speech recognition engine can implement one or more grammars to recognize speech utterances. The one or more grammars can be specific to a speech domain or can cover multiple speech domains. For example, the automatic speech recognition engine can implement a grammar specific to a spoken language, a dialect, a use case scenario (e.g., call center, business organization, educational setting, entertainment setting, etc.).

In some cases, the speech processing system 216 can implement feature normalization or adaptation algorithms to account for speaker and/or acoustic variability. For example, the acoustic variability can differ in a mobile context and an office context where background noise can be better controlled and minimized. Thus, the speech processing system 216 can implement feature normalization or adaptation to account for the acoustic variability in certain domains.

In some examples, the speech processing system 216 can implement a spoken dialog engine. The spoken dialog engine can aim to identify a user's intent as expressed in natural language, and take specific actions based on the identified intent. Such a natural language spoken dialog engine can include the automatic speech recognition engine previously described, as well as other components such as a spoken language understanding engine, a dialog management engine, a synthesizing engine, etc.

The spoken language understanding engine can use a natural language understanding model to analyze words in a speech input to derive a meaning from the speech input. The dialog management engine can interact with a user in a natural way and help the user achieve certain tasks. For example, the dialog management engine can receive the meaning of a speech input from the spoken language understanding engine and determine an action such as, for example, providing a prompt or response to the user. The synthesizing engine can be any type of speech output engine. For example, the synthesizing engine can be an engine that selects a prerecorded speech segment and outputs the prerecorded speech segment to the user.

In this way, the speech processing system 216 and/or a spoken dialog engine implemented by the speech processing system 216 can recognize speech input, such as speech utterances, identify (or understand) the meaning of the speech, and determine a response to the speech input, which can be output to the user (e.g., via the endpoint 102). In this manner, the user can carry on a natural language dialog with the endpoint 102. For example, the user can provide a voice command to the endpoint 102, such as a voice command requesting that hold monitoring mode be activated, which the speech processing system 216 can recognize and use to respond to the voice command (e.g., by activating hold monitoring mode), provide a prompt or speech output to the user (e.g., a confirmation, a message, a notification, etc.), and/or carry a natural language dialog with the user.

As previously noted, the speech processing system 216 can implement a keyword detection system 218 for detecting certain keywords uttered in a call. The keyword detection system 218 can continuously monitor the call for any predefined keywords that may indicate that a user or agent (software or human) on the other end of the call has resumed the call. Certain keywords, such as "Hello" or "Thank you for holding", are commonly used by users or agents when resuming a call and can thus be indicative of a user or agent resuming a call previously on hold. Accordingly, the keyword detection system 218 can maintain a grammar of such keywords to detect any time such keywords are uttered/transmitted on a call and use this information (e.g., the detected keywords) to determine that a call was resumed.

The speech processing system 216 can also implement an active speaker detection system 220 to detect a voice transition. The voice transition can include a transition from speech/voice to music or silence, and/or a transition from music or silence to speech/voice. Such transitions can be indicative of a call being placed on hold or resuming from hold. For example, if the call is silent for a period of time or music (or other audio content such as advertisements) is played on the call for a period of time, this can be indicative of the call being on hold. If a speech/voice utterance from an active speaker is then detected, the speech/voice utterance from the active speaker can be indicative of the call transitioning from hold to resume.

On the other hand, if after detecting speech/voice utterances from an active speaker the call goes silent for a period of time or music (or other audio content) is played on the call for a period of time, this can be indicative of a transition from an active call to a hold. Accordingly, the active speaker detection system 220 can monitor for such transitions to determine if a call has transitioned to hold or resumed from hold.

In some cases, the active speaker detection system 220 can learn and/or save voice characteristics of one or more users, such as the far end user of a call with a user associated with the endpoint 102. For example, if a user associated with the endpoint 102 has an initial discussion with a remote user on a call with the user, the active speaker detection system 220 can capture and/or learn characteristics of the voice of the remote user during the initial discussion (and/or during a previous discussion/call). When the remote user later places the call on hold, the active speaker detection system 220 can monitor the call and check if any downlink communications/data match the previously-saved voice characteristics of the remote user. If the active speaker detection system 220 detects a match between the downlink communications/data on the call and the previously-saved voice characteristics of the remote user, the active speaker detection system 220 can detect that the remote user has returned to the call and determine that the call has resumed.

The call monitoring system 214 can also implement the DTMF system 222 to detect when any keys are pressed by a far-end user (e.g., the user that has placed a call on hold) that may indicate that the call has resumed. In some cases, the DTMF system 222 can detect when any keys are pressed by the far-end user which can indicate that the far-end user has returned and the call has resumed. In other cases, the DTMF system 222 can monitor for specific keys pressed that would indicate that the far-end user has returned and the call has resumed from hold.

For example, the endpoint 102 can continuously send an uplink voice message to the far-end user with instructions for notifying the endpoint 102 that the far-end user has returned and the call has resumed. The instructions can request that the far-end user press a certain key and/or make a certain utterance (e.g., "Hello") to notify the endpoint 102 that the far-end user has returned and the call has resumed. When the far-end user returns to the call, the far-end user can receive the uplink voice message and press the specified key and/or make the specified utterance to notify the endpoint 102 that the far-end user has returned. If the far-end user presses the specified key, the DTMF system 222 can detect that the specified key was pressed and notify the call monitoring system 214 that the specified key was pressed. The call monitoring system 214 can then determine that the call has resumed. If the far-end user instead makes the specific utterance, the speech processing system 216 can detect the utterance, determine that the far-end user has made the requested utterance, and inform the call monitoring system 214 that the requested utterance was detected. The call monitoring system 214 can then determine that the call has resumed from hold.

In some cases, the call monitoring system 214 can use a single mechanism to detect whether the call has resumed from hold. For example, the call monitoring system 214 can use keyword detection, active speaker detection, or DTMF detection. In other cases, the call monitoring system 214 can use a combination of mechanisms to detect whether the call has resumed from hold. For example, the call monitoring system 214 can use a combination of two or more of keyword detection, active speaker detection, and/or DTMF detection. In some cases, the call monitoring system 214 can detect that the call has resumed based on keyword detection, active speaker detection, or DTMF detection, and use another mechanism to verify such detection results. For example, if the call monitoring system 214 determines that the call has resumed based on a keyword detection, the call monitoring system 214 can use active speaker detection and/or DTMF detection to verify that the call has indeed resumed from hold and/or determine whether the determination based on the keyword detection was a false positive.

The call monitoring system 214 can implement a notification system 224 to alert the user on the endpoint 102 when it detects that the call has resumed from hold. Thus, once the call monitoring system 214 determines that the call has resumed, it can inform the notification system 224 which can then generate an alert to the user. The notification system 224 can alert the user that the call has resumed by outputting a visual and/or audio notification via the one or more output devices 208 of the endpoint 102. For example, the notification system 224 can generate a visual message which can be presented on a display of the endpoint 102 and/or a sound or audio alert (e.g., a ring, a beep, music, a speech/voice output, an audio message, etc.) for output via a speaker of the endpoint 102.

In some cases, the endpoint 102 can relay (e.g., via the one or more communication components 202) an alert/notification generated by the notification system 224 to a remote device, such as a remote speaker, a remote IoT device, a remote television, a wireless headset/headphones, a different endpoint. The remote device can be a device that may be closer to the user than the endpoint 102 (for example if the user moves away from the endpoint 102), a nearby device that may have certain audio/display capabilities that can be leveraged to alert the user and/or that can supplement an alert delivered by the endpoint 102, etc. In some examples, the endpoint 102 can detect that the user has moved away from the endpoint 102 and/or is beyond a certain proximity to the endpoint 102 and trigger such an alert/notification to be relayed to another device.

In some examples, the endpoint 102 can detect that the user has moved away from the endpoint 102 and/or is beyond a certain proximity to the endpoint 102 using the one or more sensors 210. In other examples, the endpoint 102 can communicate with one or more nearby devices to detect that the user has moved away from the endpoint 102 and/or is beyond a certain proximity to the endpoint 102. Here, the one or more nearby devices can report to the endpoint 102 that the user is within a certain proximity of such nearby devices or is (or has recently) interacting with such nearby devices, which would indicate that the user is within the certain proximity to such nearby devices.

In other examples, the endpoint 102 can use the one or more sensors 210 to detect whether the user is holding the endpoint 102 or has placed the endpoint 102 down. This can be used to infer that the user is not engaged with the endpoint 102 and/or has moved away from the endpoint 102. For example, the endpoint 102 can obtain measurements from a gyroscope, an accelerometer, an altimeter, etc., to determine an orientation, velocity, altitude, motion, etc., of the endpoint 102 (and/or changes thereof). Based on such measurements, the endpoint 102 can determine/infer whether the endpoint 102 is stationary, moving, being held by a user, etc., and use such information to determine whether the user has likely moved away from the endpoint 102. The endpoint 102 can then use such information to determine how to provide to the user the notification generated by the notification system 224 (e.g., via a display or speaker of the endpoint 102 or via a nearby device).

For example, in some cases, the endpoint 102 can determine whether to provide a visual and/or audio notification to the user based on a detected proximity of the user and/or a determination that the user has moved away from the endpoint 102. To illustrate, if the endpoint 102 determines that the user has not moved away or is within a distance that allows the user to see a display of the endpoint 102, the endpoint 102 may determine to provide a visual notification to the user and/or lower a volume of an audio notification to the user. In other examples, if the endpoint 102 determines that the user is farther away or beyond a certain proximity to the endpoint 102, the endpoint 102 may determine to increase a volume of an audio notification to the user and/or relay or broadcast the notification to one or more nearby devices.

Figure 3:
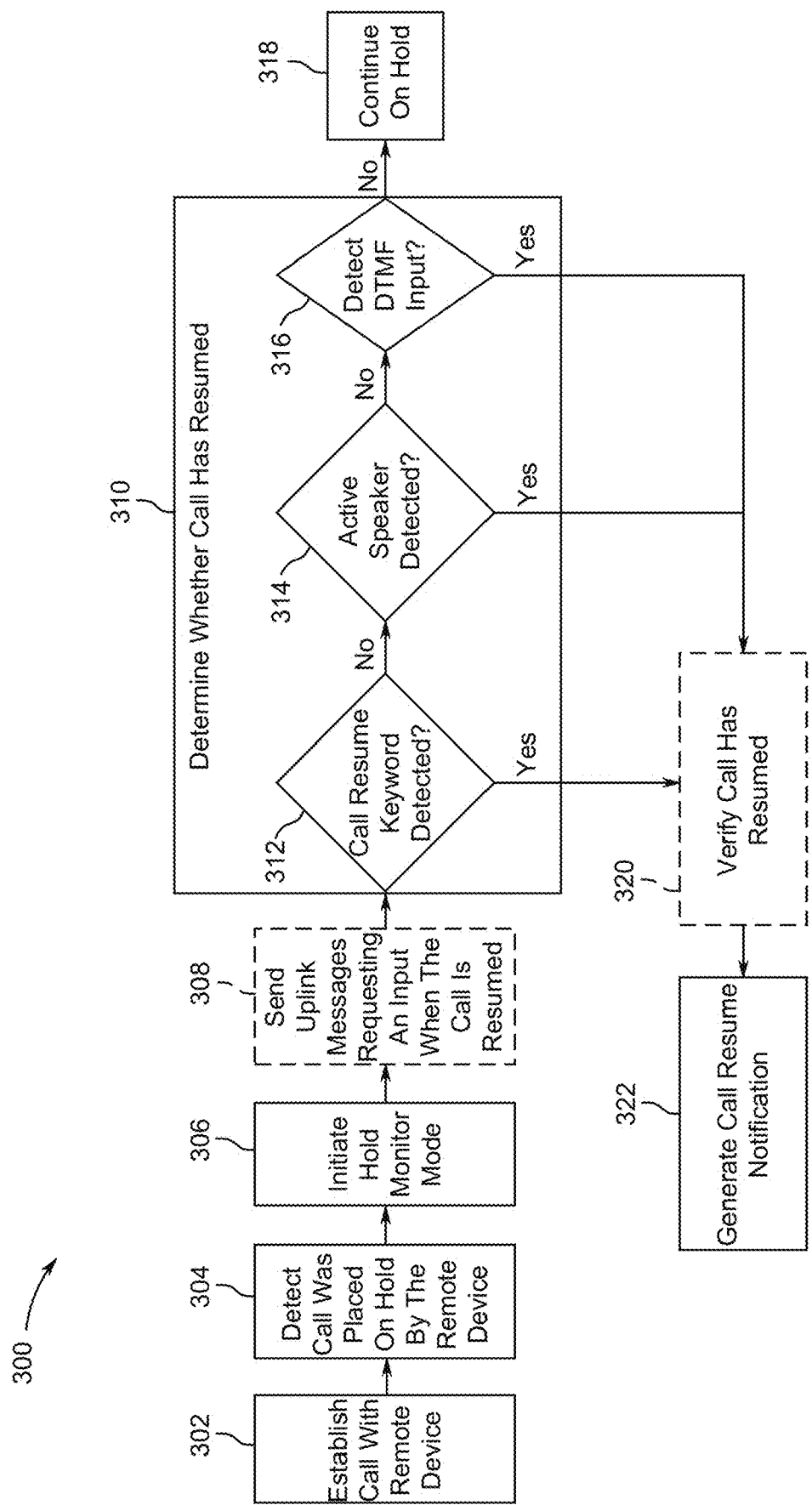
FIG. 3 illustrates a flow diagram of an example process for implementing a hold monitoring mode on an endpoint, detecting when the call has resumed, and notifying a user that the call has resumed, in accordance with some examples of the present disclosure.

FIG. 3 illustrates a flow diagram of an example process 300 for implementing a hold monitoring mode on an endpoint, detecting when the call has resumed, and notifying a user that the call has resumed. For the sake of simplicity, clarity, and explanation purposes, the process 300 is described with respect to endpoint 102 configured to perform the various blocks of the process 300 during a call (e.g., 100, 120, 140).

At block 302, the endpoint 102 can establish a call (e.g., 100, 120, 140) with a remote device. In some examples, the call can be between the endpoint 102 and a single remote device, such as a remote endpoint or call center system. In other examples, the call can be between the endpoint 102 and multiple remote devices.

At block 304, the endpoint 102 can detect that the call was placed on hold by the remote device. The endpoint 102 can detect that the call was placed on hold when the remote device activates a call hold feature, when a user at the remote device moves away from the remote device, or when the user at the remote device stops participating/engaging in the call.

In some cases, the endpoint 102 can detect that the call was placed on hold based on an input from a user at the endpoint 102 indicating that the call was placed on hold. For example, the endpoint 102 can detect that the call was placed on hold when a user at the endpoint 102 activates a hold monitoring function at the endpoint 102. The hold monitoring function can indicate that the call has been placed on hold. In some examples, the hold monitoring function can instruct the endpoint 102 to monitor the call, detect when the call has resumed after being placed on hold, and generate a notification when it detects that the call has resumed.

In other cases, the endpoint 102 can automatically detect that the call was placed on hold by monitoring the call. For example, the endpoint 102 can detect a lack of speech or sound on the call for a configurable period of time, a lack of activity (e.g., keys pressed, movement of the endpoint 102, a lack of a response for a configurable period of time to one or more voice utterances from a user at the endpoint 102, a specific voice utterance indicating that the call was placed on hold (e.g., "Please hold"), music or advertisements being played on the call (which can suggest that call was placed on hold), audio/voice prompts received during the call (e.g., "Please press 1 to receive a call-back"), and/or any other call activity/events that may indicate that the call was placed on hold. In some cases, the endpoint 102 can prompt a user at the endpoint 102 to confirm that the call has been placed on hold. For example, the endpoint 102 can prompt the user to press a key or utter one or more words to confirm that the call was placed on hold.

At block 306, the endpoint 102 can initiate a hold monitoring mode. The endpoint 102 can initiate the hold monitoring mode in response to detecting that the call was placed on hold. For example, the endpoint 102 can initiate the hold monitoring mode in response to a user at the endpoint 102 activating a hold monitoring function at the endpoint 102. The user can activate the hold monitoring function by pressing a key at the endpoint 102, uttering a voice command, activating a feature on a graphical user interface presented at the endpoint 102, etc. In another example, the endpoint 102 can initiate the hold monitoring mode in response to the endpoint 102 automatically detecting that the call was placed on hold and/or receiving confirmation from the user (e.g., in response to a prompt requesting such confirmation).

The hold monitoring mode can be implemented by a hold monitoring function at the endpoint 102. As previously noted, the hold monitoring function can trigger the endpoint 102 to monitor the call, detect when the call has resumed after being placed on hold, and generate a notification when it detects that the call has resumed. Thus, during the hold monitoring mode, the endpoint 102 can monitor the call to detect when the call is resumed.

At block 308, the endpoint 102 can optionally (e.g., as indicated by the dotted outline of block 308 in FIG. 3) send to the remote device uplink messages requesting a specific input when the call is resumed. For example, the endpoint 102 can continuously send to the remote device an uplink voice message prompting the user at the remote device to press a certain key (e.g., "Please Press 1") or make a certain speech utterance (e.g., "Please say hello") when the call is resumed. Thus, when a user at the remote device resumes the call, the user can receive the uplink voice message prompting the user to press a certain key or make a certain speech utterance to announce that the call has resumed. In such examples, when the user at the remote device resumes the call and provides the requested input, the endpoint 102 can to detect the specific input from the user at the remote device and determine that the call has resumed.

At block 310, the endpoint 102 can determine whether the call has resumed. To determine whether the call has resumed, the endpoint 102 can perform one or more of the blocks 312 through 316 shown in FIG. 3 and further described below. For example, to determine whether the call has resumed, the endpoint 102 can perform block 312, 314, or 316 shown in FIG. 3, or any combination of blocks 312, 314, and/or 316 shown in FIG. 3. Moreover, it should be noted that while blocks 312, 314, and 316 are shown in a particular order in FIG. 3, in cases where the endpoint 102 implements a combination of blocks 312, 314, and/or 316, such combination of blocks can be performed in any order or sequence including a different order or sequence than shown in FIG. 3.

In some cases, at block 312, the endpoint 102 can determine whether a call resume keyword has been detected by the endpoint 102. The endpoint 102 can continuously monitor the call to check for the call resume keyword from the remote device. The call resume keyword can be predefined keyword(s) that may indicate that a user or agent at the other end of the call (e.g., the remote device) has resumed the call or a specific keyword requested via an uplink message sent to the remote device as previously described with respect to block 308.

For example, certain keywords, such as "Hello" or "Thank you for holding", are commonly used by users or agents when resuming a call and can thus be indicative of a user or agent resuming a call previously on hold. Accordingly, the endpoint 102 can maintain a list of such keywords to detect any time such keywords are uttered/transmitted on a call and use this information (e.g., the detected keywords) to determine that a call was resumed. The endpoint 102 can detect anytime a keyword is received on the call, recognize the keyword received, and compare the keyword with a list of predefined keywords used by the endpoint 102 to detect whether a call has resumed.

In some cases, the endpoint 102 can learn new keywords and/or unlearn current keywords by calculating an accuracy of keywords detected by the endpoint 102 during a call transition from hold to resume. For example, when the endpoint 102 detects a new keyword and determines that the new keyword can accurately indicate (e.g., within a confidence level or probability) that the call has resumed from a hold status, the endpoint 102 can update the list of keywords to include the new keyword for future use. In some cases, the endpoint 102 can assign confidence levels (e.g., weights or probabilities) to keywords in the list of keywords based on their calculated accuracies at predicting/indicating that a call has resumed. For example, the endpoint 102 can use a confidence level calculated for a keyword to determine whether detecting such keyword should trigger a determination that the call has resumed or whether the endpoint 102 should assess other conditions/factors when detecting such keyword to confirm that the call has resumed.

To illustrate, the endpoint 102 may assign a high confidence level to a first keyword and a lower confidence level to a second keyword. If the endpoint 102 detects the first keyword, the endpoint 102 may determine that the call has resumed based on the detection of the first keyword and the high confidence level associated with the first keyword. On the other hand, if the endpoint 102 detects the second keyword, before determining that the call has resumed based on the detection of the second keyword, the endpoint 102 may determine that it should verify that the call has resumed in view of the lower confidence level associated with the second keyword. To verify whether the call has resumed, the endpoint 102 can implement blocks 314 and/or 316 described below, wait a certain period of time to determine if other keywords or cues (e.g., activity, pressed keys, speech, etc.) are detected that may confirm that the call has resumed, and/or send a prompt to the remote device requesting an input confirming that the call has resumed.

If at block 312 the endpoint 102 detects a call resume keyword, the endpoint 102 can continue to block 320 to verify that the call has resumed as further described below, or the endpoint 102 can optionally continue directly to block 322 to generate a call resume notification, as further described below. On the other hand, if the endpoint 102 does not detect a call resume keyword at block 312, the endpoint 102 can continue to block 314.

At block 314, the endpoint 102 can determine whether an active speaker has been detected. The endpoint 102 can continuously monitor for an active speaker at the remote device. The endpoint 102 can determine whether speech has been received from the remote device since the call was placed on hold, which may indicate that there is an active speaker at the remote device. The active speaker detection can indicate that the call has transitioned from hold to resume.

In some cases, the endpoint 102 can learn and/or save one or more voice characteristics of the user or agent at the remote device, and use the one or more voice characteristics to detect when the user or agent at the remote device actively speaks. For example, if a user at the endpoint 102 has an initial discussion with a remote user at the remote device, the endpoint 102 can capture and/or learn one or more characteristics of the voice of the remote user during such initial discussion (and/or during a previous discussion/call). When the remote user later places the call on hold, the endpoint 102 can monitor the call and check if any downlink communications/data match the previously-saved voice characteristics of the remote user. If the endpoint 102 detects a match between the downlink communications/data on the call and the previously-saved voice characteristics of the remote user, the endpoint 102 can determine that the remote user has returned to the call and the call has resumed.

The one or more voice characteristics can include, for example, a pitch (e.g., highness or lowness of sound on a scale), a volume, a tone, a vocal range, an inflection (e.g., rising and falling of pitch), a speech rate or speed, vocal resonation (e.g., adenoidal/nasal voice), breathing noises, an intensity, an accent/dialect, speech patterns, and/or any other voice characteristics. Moreover, in some cases, the endpoint 102 can use the one or more voice characteristics to distinguish between speech or voice utterances from the user or agent at the remote device and speech or voice utterances from any other user or agent. For example, the endpoint 102 can use such one or more characteristics to distinguish between speech or voice utterances from a user at the remote device and an automated voice message/prompt at the remote device and/or speech or voice utterances from one or more users associated with a different device on the call (e.g., endpoint 102).

If at block 314 the endpoint 102 detects an active speaker, the endpoint 102 can continue to block 320 to verify that the call has resumed or the endpoint 102 can optionally continue directly to block 322 to generate a call resume notification. On the other hand, if the endpoint 102 does not detect an active speaker at block 314, the endpoint 102 can continue to block 316.

At block 316, the endpoint 102 can determine whether a DTMF input has been detected after the call was placed on hold. In some examples, the endpoint 102 can continuously monitor for any keys pressed at the remote device and determine that the call has resumed if it detects any keys pressed at the remote device. When a key is pressed at the remote device, the remote device can send specific tone frequencies to the endpoint 102, which the endpoint 102 can use to determine that a key was pressed at the remote device. A determination that a key was pressed at the remote device can indicate that a user has resumed the call or otherwise returned to the call.

In other examples, the endpoint can continuously monitor for one or more specific keys pressed at the remote device. For example, the endpoint 102 can have one or more predefined keys it checks to determine if the call has resumed. The one or more predefined keys can be, for example, one or more specific keys selected for the remote user to press to announce that the call has resumed or one or more specific keys identified in a prompt to the remote user at optional block 308.

In some examples, when a key is pressed at the remote device, the endpoint 102 can identify which specific key was pressed based on a combination of tone frequencies received when that specific key was pressed. For example, the endpoint 102 can associate different keys with different frequency variations. The endpoint 102 can thus distinguish between different keys pressed at the remote device based on the different frequency variations associated with the different keys and the signal received by the endpoint 102 when a specific key is pressed at the remote device.

If a call resume keyword is not detected at block 312, an active speaker is not detected at block 314, and a DTMF input is not detected at block 316, the endpoint 102 can continue on hold at block 318. On the other hand, if a call resume keyword is detected at block 312, an active speaker is detected at block 314, and/or a DTMF input is detected at block 316, the endpoint 102 can optionally continue to block 320 or otherwise continue directly to block 322.

At block 320, the endpoint 102 can optionally verify that the call has resumed. The endpoint 102 can perform block 320 to verify that a determination at blocks 312, 314, and/or 316 that the call was resumed is not a false positive. In some cases, the endpoint 102 can verify that the call has resumed by repeating blocks 312, 314, and/or 316. For example, if the endpoint 102 determines that the call has resumed based on a detection of a call resume keyword at block 312, the endpoint 102 can subsequently check for additional call resume keywords and/or perform blocks 314 and/or 316, in order to verify that the call has indeed resumed. If the endpoint 102 determines that the call has resumed based on a detection of an active speaker at block 314, the endpoint 102 can subsequently check for additional active speaker detections and/or perform blocks 312 and/or 316, in order to verify that the call has indeed resumed. If the endpoint 102 determines that the call has resumed based on a detection of a DTMF input at block 316, the endpoint 102 can subsequently check for an additional DTMF input(s) and/or perform blocks 312 and/or 314, in order to verify that the call has indeed resumed. If the endpoint 102 determines that the call has resumed based on a positive (e.g., Yes) result at a combination of blocks 312, 314, and/or 316, the endpoint 102 can subsequently perform any of blocks 312, 314 and/or 316 to verify that the call has indeed resumed.

In some examples, the endpoint 102 can verify that the call has resumed by prompting the user at endpoint 102 to confirm that the call has indeed resumed. For example, the endpoint 102 can generate a voice prompt and/or a visual prompt (e.g., via a graphical user interface at the endpoint 102) asking the user to confirm that the call has indeed resumed. The endpoint 102 can prompt the user at endpoint 102 to confirm that the call has resumed instead of, or in addition to, sending an uplink message to the remote device as described below, and/or repeating blocks 312, 314, and/or 316.

In other examples, the endpoint 102 can verify that the call has resumed by sending an uplink message to the remote device requesting an input confirming that the call has resumed. For example, the endpoint 102 can send a message to the endpoint 102 with a prompt (e.g., a voice prompt and/or a visual prompt that can be displayed at the remote device) requesting confirmation (e.g., via a DTMF input and/or a speech utterance) that the call has resumed. The endpoint 102 can send the uplink message instead of, or in addition to, prompting the user at endpoint 102 to confirm that the call has resumed and/or repeating blocks 312, 314, and/or 316.

After the endpoint 102 has determined at blocks 312, 314, and/or 316 that the call has resumed, or after the endpoint 102 has optionally verified at block 320 that the call has resumed, the endpoint 102 can proceed to block 322.

At block 322, the endpoint 102 can generate a call resume notification for the user at the endpoint 102. The call resume notification can alert the user that the call has resumed. The call resume notification can be a visual notification provided to the user via a display and/or an audio notification provided to the user via one or more speakers or headphones/headset.

In some examples, the endpoint 102 can display a visual message informing the user that the call has resumed. In other examples, the endpoint 102 can output an audio alert indicating that the call has resumed. The audio alert can be a specific sound or noise configured as an alert to the user that the call has resumed and/or a voice message informing the user that the call has resumed.

In some cases, the endpoint 102 can relay an alert/notification (e.g., visual and/or audio) to a remote device, such as a remote speaker, a remote IoT device, a remote television, a wireless headset/headphones, a different endpoint, etc. The remote device can be a device near the user or closer to the user than the endpoint 102 (for example if the user moves away from the endpoint 102), a device in a same location (e.g., the same house, the same building, the same room, etc.) and/or network as the user, a device within a proximity of the user and/or the endpoint 102, a remote notification device selected by the user, a remote device connected to the endpoint 102 via a wireless ad hoc or point-to-point connection (e.g., Bluetooth), and/or any other device.

In some examples, the endpoint 102 can detect that the user has moved away from the endpoint 102 and/or is beyond a certain proximity to the endpoint 102 and trigger such an alert/notification to be relayed to another device. The endpoint 102 can detect that the user has moved away from the endpoint 102 and/or is beyond a certain proximity to the endpoint 102 using one or more sensors (e.g., 210). In some examples, the endpoint 102 can communicate with one or more nearby devices to detect that the user has moved away from the endpoint 102 and/or is beyond a certain proximity to the endpoint 102. The one or more nearby devices can report to the endpoint 102 that the user is within a certain proximity of such nearby devices or is (or has recently) interacting with such nearby devices, which would indicate that the user is within the certain proximity to such one or more nearby devices.

In some examples, the endpoint 102 can detect (e.g., via one or more sensors 210) whether the user is holding the endpoint 102 or has placed the endpoint 102 down. This can be used to infer that the user is not engaged with the endpoint 102 and/or has moved away from the endpoint 102. For example, the endpoint 102 can obtain measurements from a gyroscope, an accelerometer, an altimeter, etc., to determine an orientation, velocity, altitude, motion, etc., of the endpoint 102 (and/or changes thereof). Based on such measurements, the endpoint 102 can determine/infer whether the endpoint 102 is stationary, moving, being held by a user, etc., and use such information to determine whether the user has likely moved away from the endpoint 102. The endpoint 102 can then use such information to determine how to provide to the user the notification generated at block 322.

Figure 4:
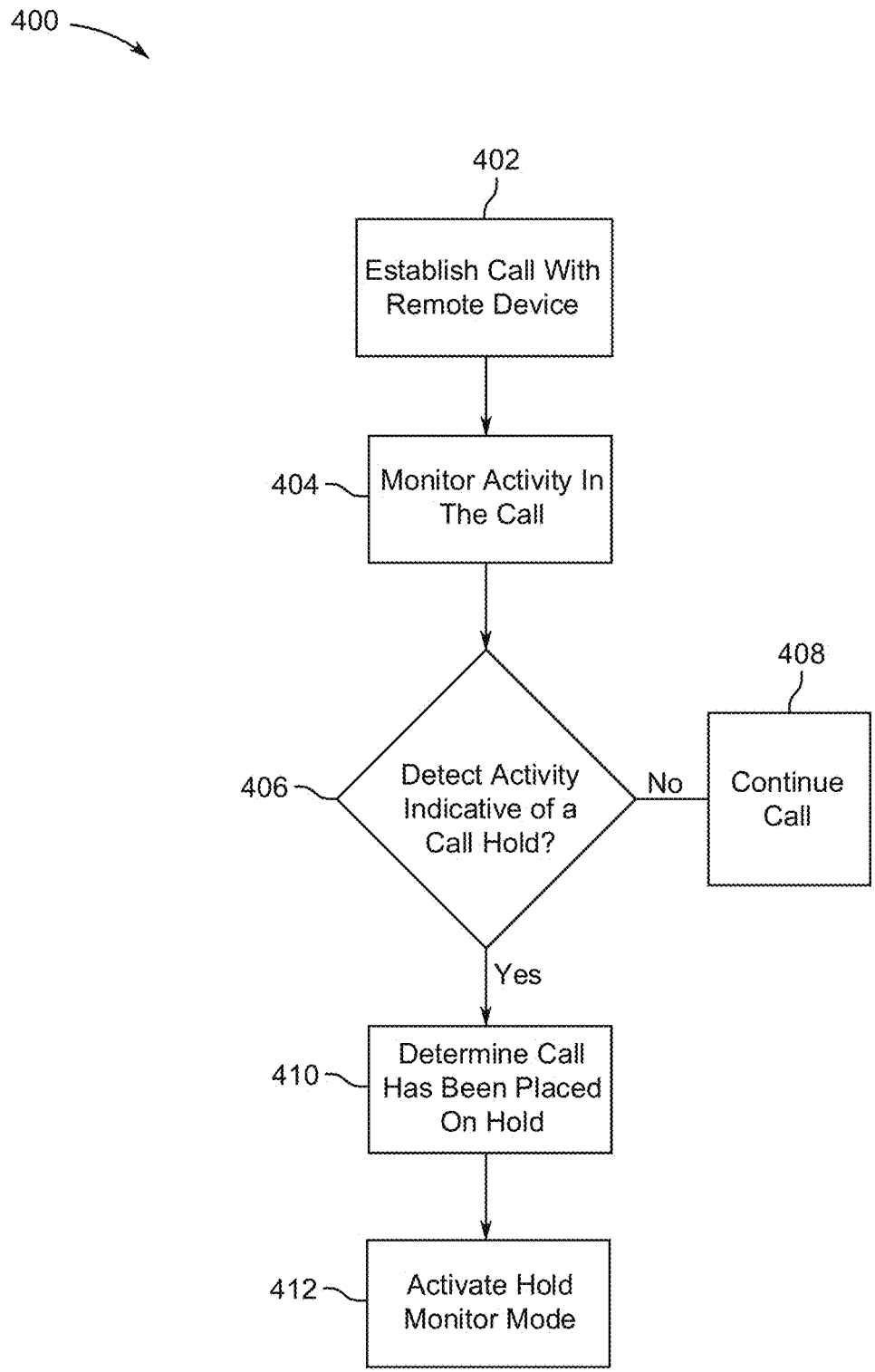
FIG. 4 illustrates an example process for automatically activating a hold monitoring mode, in accordance with some examples of the present disclosure.

FIG. 4 illustrates an example process 400 for automatically activating a hold monitoring mode. For the sake of simplicity, clarity, and explanation purposes, the process 400 is described with respect to endpoint 102 configured to perform the various blocks of the process 400 during a call (e.g., 100, 120, 140).

At block 402, the endpoint 102 can establish a call (e.g., 100, 120, 140) with a remote device. In some examples, the call can be between the endpoint 102 and a single remote device, such as a remote endpoint or call center system. In other examples, the call can be between the endpoint 102 and multiple remote devices.

At block 404, the endpoint 102 can monitor activity (and/or lack thereof) in the call to determine whether the call has been placed on hold. For example, the endpoint 102 can continuously monitor activity in the call to check for any activity (e.g., one or more conditions, events, factors, parameters, etc.) and/or lack of activity that is indicative of a call hold.

Non-limiting examples of activity or lack of activity that can be indicative of a call hold can include one or more keywords or utterances communicated in the call (e.g., "Please hold", "I will be back shortly", etc.), music or sound (e.g., advertisements, prompts, etc.) being played on the call (which can suggest that call was placed on hold), a lack of a response for a period of time to one or more voice utterances from a user at the endpoint 102 (e.g., a period of unresponsiveness from a user or agent at a remote device on the call), certain activity at the endpoint 102 (e.g., certain user interactions with the endpoint 102, use of one or more software applications at the endpoint 102, use of certain output devices at the endpoint, etc.), audio/voice prompts received during the call (e.g., "Please press 1 to receive a call-back"), a lack of certain activity on the call (e.g., no keys pressed on the call, little to no movement of the endpoint 102, etc.) for a period of time, and/or any other call activity/events that may indicate that the call was placed on hold.

At block 406, the endpoint 102 can determine whether any activity (or lack thereof) that is indicative of the call being placed on hold has been detected. If "No", the endpoint 102 can proceed to block 408 where the endpoint 102 can continue on the call. If "Yes", the endpoint 102 can proceed to block 410.

At block 410, the endpoint 102 can determine that the call has been placed on hold. In some examples, the endpoint 102 can automatically determine that the call has been placed on hold based on any detected activity (or lack thereof) that is indicative of a call hold. In other examples, the endpoint 102 can automatically generate a prompt/message (e.g., voice prompt, visual prompt, etc.) asking the user at the endpoint 102 to confirm that the call has been placed on hold. In such examples, the endpoint 102 can generate the prompt/message before determining that the call has been placed on hold or after determining that the call has been placed on hold (e.g., to verify such determination).

At block 412, the endpoint 102 can activate a hold monitoring mode. The endpoint 102 can activate the hold monitoring mode in response to determining that the call has been placed on hold. The hold monitoring mode can be implemented by a hold monitoring function at the endpoint 102. As previously explained, the hold monitoring function can trigger the endpoint 102 to monitor the call during a hold, detect when the call has resumed after being placed on hold, and generate a notification when it detects that the call has resumed.

Figure 5:
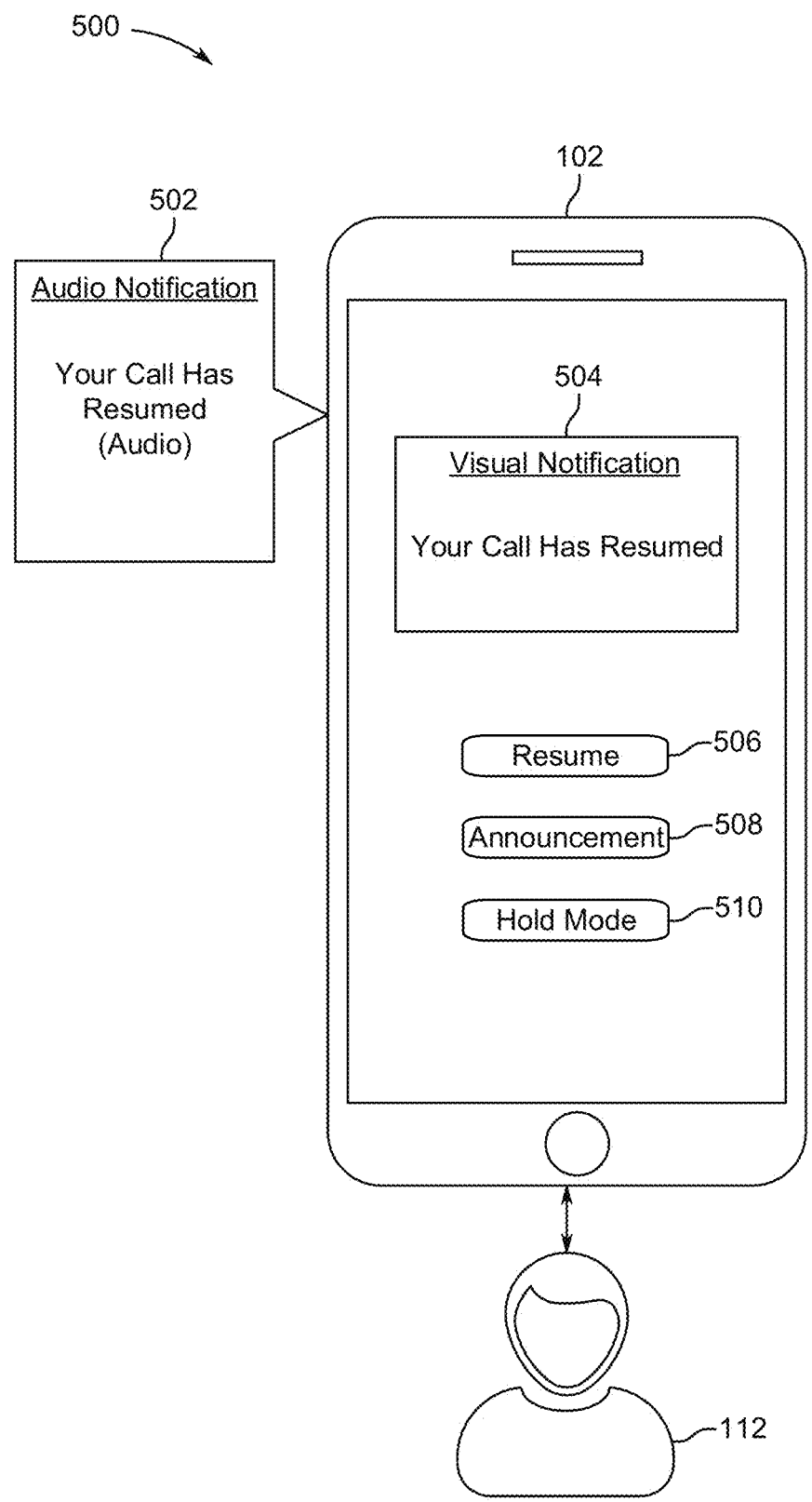
FIG. 5 illustrates an example notification use case for alerting a user at an endpoint that a call has resumed from a hold, in accordance with some examples of the present disclosure.

FIG. 5 illustrates an example notification use case 500 for alerting a user 112 at an endpoint 102 that a call has resumed from a hold. In this example, the user 112 at the endpoint 102 is engaged on a call that has been placed on hold by another user or agent at a remote device and the endpoint 102 has been running in hold monitoring mode during at least a portion of the hold.

When the endpoint 102 determines that the call has resumed, the endpoint 102 can output an audio notification 502 for the user 112, alerting the user 112 that the call has resumed (e.g., the call is no longer on hold). The endpoint 102 can output the audio notification 502 via one or more speaker devices (e.g., from output devices 208). The user 112 can configure the volume in which the endpoint 102 outputs the audio notification 502. In some examples, the endpoint 102 can output the audio notification 502 once for the user 112. In other examples, the endpoint 102 can output the audio notification 502 multiple times for the user 112. For example, the endpoint 102 can continuously output the audio notification 502 until the user 112 terminates the notifications, acknowledges the notifications, and/or rejoins the call.

In some cases, when the endpoint 102 determines that the call has resumed, the endpoint 102 can output a visual notification 504 for the user 112, alerting the user 112 that the call has resumed. The endpoint 102 can output the visual notification 504 instead of, or in addition to, outputting the audio notification 502. Moreover, the endpoint 102 can output the visual notification 504 on a display device (e.g., from output devices 208).

In some cases, the endpoint 102 can display the visual notification 504 according to a certain display pattern. For example, the endpoint 102 can display a single instance of the visual notification 504 or can display the visual notification 504 intermittently for a certain period of time. In another example, the endpoint 102 can display the visual notification 504 using a certain format (e.g., color, font, text size, etc.) and/or visual effect (e.g., animated).

Moreover, in some cases, the endpoint 102 can display the visual notification 504 for a configurable period of time or until the user 112 terminates the visual notification 504, acknowledges the visual notification 504, rejoins the call, etc. For example, the endpoint 102 can display the visual notification 504 until the user 112 activates a resume feature 506 displayed at the endpoint 102, issues a voice command to terminate the visual notification 504, or begins/resumes talking/participating on the call.

In some examples, the endpoint 102 can display a resume feature 506 for the user 112. The resume feature 506 can be an interface element that the user 112 can activate when ready to engage in the call after the call has resumed. In some examples, the user 112 can use the resume feature 506 to terminate the audio notification 502 and/or the visual notification 504, notify the endpoint 102 and/or a remote device on the call that the user is ready to engage in the call, end the hold monitoring mode at the endpoint 102, etc. In some examples, when activated, the resume feature 506 can trigger a notification to the remote device on the call alerting a user or agent at the remote device that the user 112 has returned to the call, is ready to engage in the call, and/or any other configurable message for the user or agent at the remote device.

In some cases, the endpoint 102 can display an announcement feature 508 after the endpoint 102 initiates the hold monitoring mode. The user 112 can activate the announcement feature 508 during the hold monitoring mode to set an announcement message to be provided to the user or agent at the remote device on the call when the call is resumed. For example, if the user 112 intends to move away from the endpoint 102 while the call is on hold, the user 112 can activate the announcement feature 508 to set a message alerting the user or agent at the remote device on the call that the user 112 has moved away from the endpoint 102 but will return after the call is resumed. The endpoint 102 can then provide such message to the user or agent at the remote device when the call is resumed. The user 112 can use such message to inform the user or agent at the remote device that the user 112 has moved away from the endpoint 102 but will return shortly so the user or agent at the remote device does not incorrectly assume that the user 112 did not hold for the call to resume if the user or agent at the remote device does not receive a response from the user 112 initially after the call is resumed.

For example, if the user 112 intends to move away from the endpoint 102 and is concerned that the user 112 may not be able to respond quickly if the call is resumed while the user 112 is away from the endpoint 102, the user 112 can set a message via the announcement feature 508 to inform the user or agent at the remote device on the call that the user 112 is still holding but has temporarily moved away from the endpoint 102. In some cases, if a user or agent at the remote device resumes the call and does not initially receive a response from the user 112, the user or agent at the remote device may believe that the user 112 did not wait for the call to resume and consequently terminate the call. Thus, by setting an announcement message 508 for the user or agent at the remote device, the user 112 can help prevent the user or agent at the remote device from terminating the call if the user 112 does not respond when the call is resumed.

In some examples, the endpoint 102 can display a hold mode feature 510 during a call. The hold mode feature 510 can be an interface element presented to the user at endpoint 102, which the user can use to activate a hold monitoring function and put the endpoint 102 in a hold monitoring mode. The user can activate the hold mode feature 510 by selecting the hold mode feature 510. For example, the user can click on the hold mode feature 510, provide a voice command to select the hold mode feature 510, or provide any other type of user input such as a gesture, a touch screen input, a pointing device input, etc. In some cases, the endpoint 102 can display the hold mode feature 510 throughout the entire call. In other examples, the endpoint 102 can display the hold mode feature 510 at specific times during the call. For example, the endpoint 102 can display the hold mode feature 510 upon request by the user, upon detecting that the call has been placed on hold, upon predicting that the call is likely to be placed on hold in the near future (e.g., within a period of time), at specific intervals, when a certain user on the call is speaking/active or is not speaking/active, etc.

Figure 6:
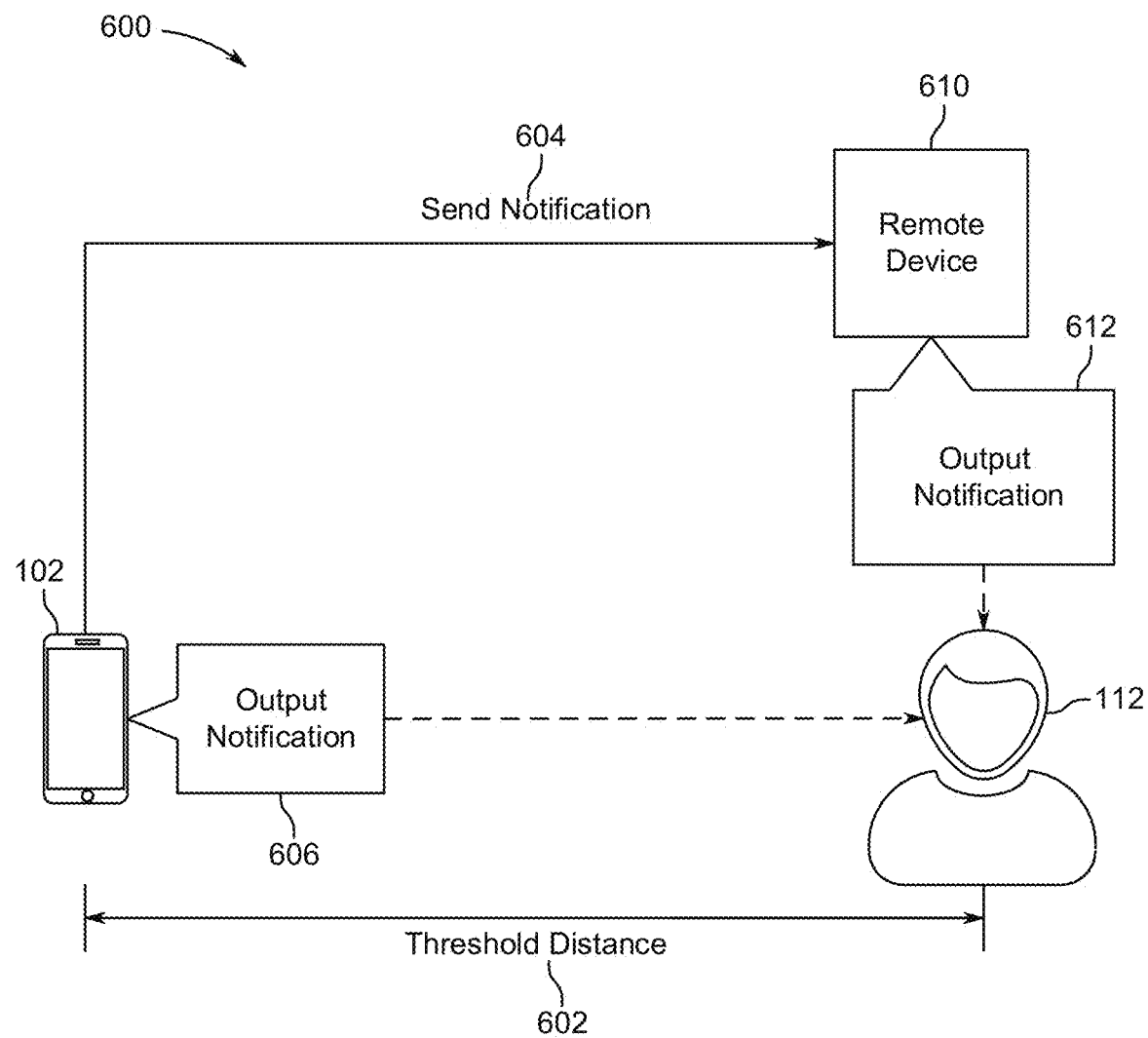
FIG. 6 illustrates an example system flow diagram for relaying or routing a call resume notification for a user to a remote device, in accordance with some examples of the present disclosure.

FIG. 6 illustrates an example system flow diagram 600 for relaying or routing a call resume notification for a user 602 to a remote device 610. In this example, a call involving the user 112 at the endpoint 102 has resumed while the user 112 is away from the endpoint 102. Moreover, the endpoint 102 has detected that the call has resumed while the endpoint 102 is in a hold monitoring mode.

When the endpoint 102 detects that the call has resumed after being placed on hold, the endpoint 102 can determine whether the user 112 has moved a threshold distance 602 away from the endpoint 102. The endpoint 102 can determine whether to send 604 a notification to the remote device 610 when the call is resumed, which can depend on whether the endpoint 102 determines that the user 112 has moved a threshold distance 602 away from the endpoint 102.

In some examples, the threshold distance 602 can be configured by the user 112 and/or predefined at the endpoint 102. In other examples, the endpoint 102 can calculate the threshold distance 602 based on audio output capabilities at the endpoint 102. For example, the endpoint 102 can determine the audio output range of one or more audio output devices at the endpoint 102, and calculate the threshold distance 602 relative to the audio output range. To illustrate, if the endpoint 102 determines that the audio output range of the one or more audio output devices at the endpoint 102 is between approximately 10 to 15 meters, the endpoint 102 can set the threshold distance 602 to a distance outside of the 10 to 15 meters range, a distance within the 10 to 15 meters range, and/or a certain proximity to the 10 to 15 meters range (e.g., x meters less than 10 meters, x meters less than 15 meters, etc.). This way, the endpoint 102 can avoid, or limit the likelihood of, the user 112 missing or failing to hear an audio notification provided by the endpoint 102 via the one or more audio output devices at the endpoint 102.

In other examples, the endpoint 102 can set the threshold distance 602 to any distance away from the endpoint 102. For example, if the endpoint 102 determines that the user 112 is away from the endpoint 102, the endpoint 102 can determine that the threshold distance 602 is satisfied by the user 112 being away from the endpoint 102. In some cases, the endpoint 102 can determine or infer that the user 112 is away from the endpoint 102 anytime the endpoint 102 is stationary. The endpoint 102 can determine or infer that the endpoint 102 is stationary based on one or more sensor measurements indicating a lack (or limited) of movement and/or acceleration by the endpoint 102 (e.g., motion/acceleration caused by the user 112 holding or moving the endpoint 102), a certain orientation of the endpoint 102 (e.g., an orientation indicative of the endpoint 102 being placed on a surface), a certain altitude of the endpoint 102, etc. In some examples, the endpoint 102 can determine or infer that the endpoint 102 is stationary when the endpoint 102 determines that the endpoint 102 is connected to a stationary device, such as a dock.

In some cases, the endpoint 102 can determine that the user 112 has moved away from the endpoint 102 using one or more sensors (e.g., 210). For example, the endpoint 102 can obtain measurements from a proximity sensor, an image sensor, a touch sensor, a temperature sensor, a motion detection sensor, a light-emitting sensor, etc., and use such measurements to determine a distance/proximity between the user 112 and the endpoint 102 and/or whether the user 112 is holding the endpoint 102 or has moved away from the endpoint 102.

In other cases, the endpoint 102 can, alternatively or additionally, communicate with the remote device 610 (and/or any other remote devices) to determine whether the user 112 has moved away from the endpoint 102 and/or to determine a proximity of the user 112 to the endpoint 102. For example, the endpoint 102 and the remote device 610 can establish a wireless connection (e.g., via a local area network or a point-to-point connection such as Bluetooth), which the remote device 610 can use to report to the endpoint 102 that the user 112 is within a proximity of the remote device 610 and/or is interacting with the remote device 610. In some cases, the endpoint 102 can send a message or request to the remote device 610 (and/or any other nearby devices) configured to trigger the remote device 610 to check and report whether the user 112 is interacting with the remote device 610 and/or within a proximity of the remote device 610.

The remote device 610 can include, for example, a remote speaker (e.g., a wireless speaker), a remote IoT device, a remote television, a remote laptop computer, a remote tablet computer, a remote phone, a smart wearable device, an electronic device on a same local area network as the endpoint 102, an electronic device having a point-to-point connection with the endpoint 102, a wireless headset/headphone, a different endpoint, and/or any other suitable device. Moreover, the remote device 610 can determine whether the user 112 is interacting with the remote device 610 and/or within a proximity of the remote device 610 based on an activity at the remote device 610 and/or sensor measurements (e.g., velocity or motion measurements, orientation measurements, proximity measurements, acceleration measurements, touch sensor measurements, etc.) obtained by the remote device 610.

After determining whether the user 112 is interacting with the remote device 610 and/or within a proximity of the remote device 610, the remote device 610 can communicate with the endpoint 102 to report whether the user 112 is interacting with the remote device 610 and/or within a proximity of the remote device 610. In some cases, the remote device 610 can also report its location, which the endpoint 102 can use to help determine whether the user 112 is the threshold distance 602 away from the endpoint 102. In other cases, the endpoint 102 can store information about the location of the remote device 610, which it can similarly use to determine whether the user 112 is the threshold distance 602 away from the endpoint 102.

When the call is resumed and the endpoint 102 determines that the user 112 has moved a threshold distance 602 away from the endpoint 102 and/or that the endpoint 102 is currently stationary, the endpoint 102 can send 604 a notification to the remote device 610, which the remote device 610 can use to output 612 a notification alerting the user 112 that the call has resumed. The notification to the remote device 610 can include, for example, an alert or notification that the remote device 610 can output for the user 112 and/or instructions for the remote device 610 to generate and/or output such an alert or notification. Moreover, the notification that the remote device 610 outputs for the user 112 can include an alert notifying the user that the call has resume. Such an alert can be an audio and/or visual alert or notification, as previously described.

In some cases, in addition to sending 604 a notification to the remote device 610, the endpoint 102 can output 606 a notification using one or more output devices 208 at the endpoint 102, such as a speaker device, a display device, a light-emitting device (e.g., to flash or generate a light), etc. The endpoint 102 can output 606 the notification in case the user 112 (or another user that can relay the information to the user 112) can actually receive (e.g., hear or see) the notification from a current location of the user 112.

Moreover, in some cases, instead of, or in addition to, sending 604 a notification to the remote device 610, the endpoint 102 can broadcast the notification to a group of devices on a local area network and/or broadcast the notification to a group of devices having a point-to-point connection to the endpoint 102. For example, if the endpoint 102 is connected to a wireless local area network, the endpoint 102 can broadcast the notification on the wireless local area network. Any devices on the wireless local area network can receive the notification and output the notification for the user.

Having described example systems and technologies, the disclosure now turns to the example method 700 shown in FIG. 7. The blocks outlined in the method 700 are examples and can be implemented in any combination thereof, including combinations that exclude, add, or modify certain blocks.

At block 702, the method 700 can include establishing a call (e.g., 100, 120, 140) between an endpoint (e.g., 102) and a remote device (e.g., 102A, 102B, 102N, 142).

At block 704, the method 700 can include determining the call is or has been placed on hold by the remote device. At block 706, the method 700 can include monitoring (e.g., via the endpoint), based on the call being placed on hold by the remote device, the call for an indication of a call resume transition. The indication of the call resume transition can include a particular keyword (e.g., a predefined word uttered by a speaker at the remote device) transmitted by the remote device, an active speaker at the remote device, and/or a DTMF input from the remote device. Moreover, monitoring the call can include monitoring for any communications received from the remote device and analyzing any received communications to determine whether such communications include the particular keyword, the active speaker, and/or the DTMF input.

In some cases, the method 700 can include sending, (e.g., via the endpoint) to the remote device, one or more messages including instructions prompting a call participant at the remote device to utter the particular keyword or provide the DTMF input when resuming the call from a hold state. In some examples, the one or more messages can be sent after the call is placed on hold by the remote device.

At block 706, the method 700 can include detecting (e.g., via the endpoint) the indication of the call resume transition. The indication of the call resume transition can be detected by analyzing any communications received from the remote device after the call was placed on hold. For example, the indication of the call resume transition can be detected by monitoring communications transmitted from the remote device on the call, and determining that one or more communications include an utterance of the particular keyword, the DTMF input, and/or an active speaker.

At block 708, the method 700 can include generating (e.g., via the endpoint), in response to detecting the indication of the call resume transition, a notification (e.g., 502, 504) indicating that the hold has ended and the call has resumed. In some examples, the notification can include an audio notification and/or a visual notification. Moreover, in some examples, generating the notification can include outputting (e.g., via one or more output devices 208) the audio notification and/or the visual notification via the endpoint and/or routing the notification to a wireless device for output by the wireless device.

In some aspects, the method 700 can include receiving (e.g., via the endpoint) an input requesting to initiate a hold monitoring mode at the endpoint, initiating the hold monitoring mode in response to the input, and monitoring the call during the hold monitoring mode for the indication of the call resume transition. In some examples, the hold monitoring mode can trigger the endpoint to monitor the call and generate the notification based on the detecting of the indication of the call resume transition.

In some aspects, the method 700 can include receiving (e.g., via the endpoint), after the call is placed on hold by the remote device, a communication from the remote device, the communication including one or more utterances; recognizing (e.g., via the endpoint), using automatic speech processing (e.g., via speech processing system 216), speech corresponding to the one or more utterances, the speech including one or more words; and detecting (e.g., via the endpoint) the particular keyword and/or the active speaker at the remote device based on the recognized speech. In some cases, the particular keyword can include a predefined word identified as a call resume transition keyword, and detecting the particular keyword and/or the active speaker can include determining that at least one of the one or more words matches the predefined word.

In some examples, the method 700 can further include receiving (e.g., via the endpoint), while the call is on hold and before receiving the communication including the one or more utterances, a different communication from the remote device, the different communication including music played on the call; detecting (e.g., via the endpoint) a transition from music played on the call to the active speaker, the call resume transition including the transition from the music played on the call to the active speaker; and determining (e.g., via the endpoint) that the call has transitioned from a hold to a resume state based on the detected transition from music played on the call to the active speaker.

In some aspects, the method 700 can include receiving (e.g., via the endpoint) a first communication from the remote device, the first communication including one or more utterances; identifying (e.g., via the endpoint) one or more voice characteristics associated with the one or more utterances; receiving (e.g., via the endpoint), after the call is placed on hold, a second communication from the remote device, the second communication including one or more additional utterances; determining (e.g., via the endpoint) whether one or more additional voice characteristics associated with the one or more additional utterances match the one or more voice characteristics associated with the one or more utterances; and detecting (e.g., via the endpoint) the active speaker at the remote device based on a match between the one or more additional voice characteristics associated with the one or more additional utterances and the one or more voice characteristics associated with the one or more utterances. In some examples, the one or more voice characteristics associated with the one or more utterances and the one or more additional voice characteristics associated with the one or more additional utterances can include a pitch, a volume, a tone, a vocal range, an inflection, a speech rate, vocal resonation, one or more breathing noises, an intensity, an accent, and/or a speech pattern.

In some aspects, the method 700 can include receiving (e.g., via the endpoint), while the call is on hold and before the second communication, a third communication from the remote device, the third communication including music played on the call; based on the first communication, the second communication, and the third communication, detecting (e.g., via the endpoint) a first transition from a voice communication to music played on the call and a second transition from the music played on the call to the active speaker, the call resume transition including the second transition from the music played on the call to the active speaker; and determining (e.g., via the endpoint) that the call has transitioned from a hold to a resume state based on the second transition from music played on the call to the active speaker.

In some aspects, the method 700 can include detecting (e.g., via the endpoint) that the remote device has placed the call on hold. In some examples, detecting that the remote has placed the call on hold can be based on a recognized keyword uttered by a first speaker at the remote device, a lack of communications received from the remote device for a period of time, and/or one or more utterances associated with a second speaker at the endpoint.

In some aspects, the method 700 can include determining (e.g., via the endpoint) that a user associated with the endpoint has moved away from the endpoint; determining (e.g., via the endpoint) that the user is within a proximity of a wireless device having audio capabilities and/or display capabilities; and sending (e.g., via the endpoint), to the wireless device, an instruction to output, via the audio capabilities and/or the display capabilities, the notification indicating that the hold has ended and the call has resumed.

In some examples, the method 700 may be performed by one or more computing devices or apparatuses. In one illustrative example, the method 700 can be performed by the endpoint 102 shown in FIG. 2 and/or one or more computing devices with the computing device architecture 800 shown in FIG. 8. In some cases, such a computing device or apparatus may include a processor, microprocessor, microcomputer, or other component of a device that is configured to carry out the blocks of the method 700. In some examples, such computing device or apparatus may include one or more sensors configured to collect sensor measurements. For example, the computing device can include a smartphone, a mobile device, or other suitable device. In some cases, such computing device may include a display for notifications and/or a speaker device for outputting audio notifications. Such computing device may further include a network interface configured to communicate data.

The method 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 illustrates an example computing device architecture 800 of an example computing device which can implement the various techniques described herein. The components of the computing device architecture 800 are shown in electrical communication with each other using a connection 805, such as a bus. The example computing device architecture 800 includes a processing unit (CPU or other processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other components can control or be configured to control the processor 810 to perform various actions. Other computing device memory 815 may be available for use as well. The memory 815 can include multiple different types of memory with different performance characteristics. The processor 810 can include any general purpose processor and hardware or software configured to control the processor 810, as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can store software for controlling the processor 810. Other hardware or software components are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1: A method comprising establishing a call between an endpoint and a remote device; determining the call is placed on hold by the remote device; monitoring, by the endpoint based on the call being placed on hold, the call for an indication of a call resume transition, the indication of the call resume transition comprising at least one of a particular keyword transmitted by the remote device, an active speaker at the remote device, and a dual-tone multi-frequency signaling (DTMF) input from the remote device; detecting, by the endpoint, the indication of the call resume transition; and in response to detecting the indication of the call resume transition, generating, by the endpoint, a notification indicating that the hold has ended and the call has resumed.

Example 2: A method according to Example 2, further comprising receiving, by the endpoint, an input requesting to initiate a hold monitoring mode at the endpoint; initiating, by the endpoint, the hold monitoring mode in response to the input; and monitoring, by the endpoint, the call during the hold monitoring mode for the indication of the call resume transition.

Example 3: A method according to Example 2, wherein the hold monitoring mode triggers the endpoint to monitor the call and generate the notification based on the detecting of the indication of the call resume transition.

Example 4: A method according to any of Examples 1 to 3, further comprising receiving, by the endpoint, a communication from the remote device, the communication comprising one or more utterances, wherein the communication is received after the call being placed on hold by the remote device; recognizing, by the endpoint using automatic speech processing, speech corresponding to the one or more utterances, the speech comprising one or more words; and detecting, by the endpoint, at least one of the particular keyword and the active speaker at the remote device based on the recognized speech.

Example 5: A method according to Example 4, wherein the particular keyword comprises a predefined word identified as a call resume transition keyword, and wherein detecting the at least one of the particular keyword and the active speaker comprises determining that at least one of the one or more words matches the predefined word.

Example 6: A method according to any of Examples 4 to 5, further comprising receiving, by the endpoint, a different communication from the remote device, the different communication comprising music played on the call, wherein the different communication is received while the call is on hold and before receiving the communication comprising the one or more utterances; detecting, by the endpoint, a transition from music played on the call to the active speaker, wherein the call resume transition comprises the transition from the music played on the call to the active speaker; and determining, by the endpoint, that the call has transitioned from a hold to a resume state based on the detected transition from music played on the call to the active speaker.

Example 7: A method according to any of Examples 1 to 6, further comprising receiving, by the endpoint, a first communication from the remote device, the first communication comprising one or more utterances; identifying, by the endpoint, one or more voice characteristics associated with the one or more utterances; receiving, by the endpoint, a second communication from the remote device, the second communication comprising one or more additional utterances, wherein the second communication is received after the call being placed on hold by the remote device; determining, by the endpoint, whether one or more additional voice characteristics associated with the one or more additional utterances match the one or more voice characteristics associated with the one or more utterances; and detecting, by the endpoint, the active speaker at the remote device based on a match between the one or more additional voice characteristics associated with the one or more additional utterances and the one or more voice characteristics associated with the one or more utterances.

Example 8: A method according to Example 7, wherein the one or more voice characteristics associated with the one or more utterances and the one or more additional voice characteristics associated with the one or more additional utterances comprise at least one of a pitch, a volume, a tone, a vocal range, an inflection, a speech rate, vocal resonance, one or more breathing noises, an intensity, an accent, and a speech pattern.

Example 9: A method according to any of Example 7 to 8, further comprising receiving, by the endpoint, a third communication from the remote device, the third communication comprising music played on the call, wherein the third communication is received while the call is on hold and before the second communication; based on the first communication, the second communication, and the third communication, detecting, by the endpoint, a first transition from a voice communication to music played on the call and a second transition from the music played on the call to the active speaker, wherein the call resume transition comprises the second transition from the music played on the call to the active speaker; and determining, by the endpoint, that the call has transitioned from a hold to a resume state based on the second transition from music played on the call to the active speaker.

Example 10: A method according to any of Examples 1 to 9, further comprising sending, by the endpoint to the remote device, one or more messages comprising instructions prompting a call participant at the remote device to utter the particular keyword or provide the DTMF input when resuming the call from a hold state, wherein the one or more messages are sent after the call is placed on hold by the remote device.

Example 11: A method according to any of Examples 1 to 10, further comprising detecting, by the endpoint, that the remote device has placed the call on hold, the endpoint detecting that the remote has placed the call on hold based on at least one of a recognized keyword uttered by a first speaker at the remote device, a lack of communications received from the remote device for a period of time, and one or more utterances associated with a second speaker at the endpoint.

Example 12: A method according to any of Examples 1 to 11, further comprising determining, by the endpoint, that a user associated with the endpoint has moved away from the endpoint; determining, by the endpoint, that the user is within a proximity of a wireless device having at least one of audio capabilities and display capabilities; and sending, by the endpoint to the wireless device, an instruction to output, via the at least one of the audio capabilities and the display capabilities, the notification indicating that the hold has ended and the call has resumed.

Example 13: A method according to any of Examples 1 to 13, wherein the notification comprises at least one of an audio notification and a visual notification, and wherein generating the notification comprises outputting the at least one of the audio notification and the visual notification.

Example 14: An apparatus comprising: one or more processors; and at least one non-transitory computer-readable medium having stored therein instructions which, when executed by the one or more processors, cause the apparatus to: establish a call with a remote device; determine the call is placed on hold by the remote device; monitor, based on the call being placed on hold, the call for an indication of a call resume transition, the indication of the call resume transition comprising at least one of a particular keyword transmitted by the remote device, an active speaker at the remote device, and a dual-tone multi-frequency signaling (DTMF) input from the remote device; detect the indication of the call resume transition; and in response to detecting the indication of the call resume transition, generate a notification indicating that the hold has ended and the call has resumed.

Example 15: An apparatus according to Example 14, the at least one non-transitory computer-readable medium storing instructions which, when executed by the one or more processors, cause the apparatus to: receive an input requesting to initiate a hold monitoring mode at the apparatus; initiate the hold monitoring mode in response to the input; and monitor the call during the hold monitoring mode for the indication of the call resume transition.

Example 16: An apparatus according to Example 15, wherein the hold monitoring mode triggers the apparatus to monitor the call and generate the notification based on the detecting of the indication of the call resume transition.

Example 17: An apparatus according to any of Examples 14 to 16, the at least one non-transitory computer-readable medium storing instructions which, when executed by the one or more processors, cause the apparatus to: receive a communication from the remote device, the communication comprising one or more utterances, wherein the communication is received after the call being placed on hold by the remote device; recognize, using automatic speech processing, speech corresponding to the one or more utterances, the speech comprising one or more words; and detect at least one of the particular keyword and the active speaker at the remote device based on the recognized speech.

Example 18: An apparatus according to Example 17, wherein the particular keyword comprises a predefined word identified as a call resume transition keyword, and wherein detecting the at least one of the particular keyword and the active speaker comprises determining that at least one of the one or more words matches the predefined word.

Example 19: An apparatus according to any of Examples 17 to 18, the at least one non-transitory computer-readable medium storing instructions which, when executed by the one or more processors, cause the apparatus to: receive a different communication from the remote device, the different communication comprising music played on the call, wherein the different communication is received while the call is on hold and before receiving the communication comprising the one or more utterances; detect a transition from music played on the call to the active speaker, wherein the call resume transition comprises the transition from the music played on the call to the active speaker; and determine that the call has transitioned from a hold to a resume state based on the detected transition from music played on the call to the active speaker.

Example 20: An apparatus according to any of Examples 14 to 19, the at least one non-transitory computer-readable medium storing instructions which, when executed by the one or more processors, cause the apparatus to: receive a first communication from the remote device, the first communication comprising one or more utterances; identify one or more voice characteristics associated with the one or more utterances; receive a second communication from the remote device, the second communication comprising one or more additional utterances, wherein the second communication is received after the call being placed on hold by the remote device; determine whether one or more additional voice characteristics associated with the one or more additional utterances match the one or more voice characteristics associated with the one or more utterances; and detect the active speaker at the remote device based on a match between the one or more additional voice characteristics associated with the one or more additional utterances and the one or more voice characteristics associated with the one or more utterances.

Example 21: An apparatus according to Example 20, wherein the one or more voice characteristics associated with the one or more utterances and the one or more additional voice characteristics associated with the one or more additional utterances comprise at least one of a pitch, a volume, a tone, a vocal range, an inflection, a speech rate, vocal resonation, one or more breathing noises, an intensity, an accent, and a speech pattern.

Example 22: An apparatus according to any of Examples 20 to 21, the at least one non-transitory computer-readable medium storing instructions which, when executed by the one or more processors, cause the apparatus to: receive a third communication from the remote device, the third communication comprising music played on the call, wherein the third communication is received while the call is on hold and before the second communication; based on the first communication, the second communication, and the third communication, detect a first transition from a voice communication to music played on the call and a second transition from the music played on the call to the active speaker, wherein the call resume transition comprises the second transition from the music played on the call to the active speaker; and determine that the call has transitioned from a hold to a resume state based on the second transition from music played on the call to the active speaker.

Example 23: An apparatus according to any of Examples 14 to 22, the at least one non-transitory computer-readable medium storing instructions which, when executed by the one or more processors, cause the apparatus to: send, to the remote device, one or more messages comprising instructions prompting a call participant at the remote device to utter the particular keyword or provide the DTMF input when resuming the call from a hold state, wherein the one or more messages are sent after the call is placed on hold by the remote device.

Example 24: An apparatus according to any of Examples 14 to 23, the at least one non-transitory computer-readable medium storing instructions which, when executed by the one or more processors, cause the apparatus to: detect that the remote device has placed the call on hold, the apparatus detecting that the remote has placed the call on hold based on at least one of a recognized keyword uttered by a first speaker at the remote device, a lack of communications received from the remote device for a period of time, and one or more utterances associated with a second speaker at the apparatus.

Example 25: An apparatus according to any of Examples 14 to 24, the at least one non-transitory computer-readable medium storing instructions which, when executed by the one or more processors, cause the apparatus to: determine that a user associated with the apparatus has moved away from the apparatus; determine that the user is within a proximity of a wireless device having at least one of audio capabilities and display capabilities; and send, to the wireless device, an instruction to output, via the at least one of the audio capabilities and the display capabilities, the notification indicating that the hold has ended and the call has resumed.

Example 26: An apparatus according to any of Examples 14 to 25, wherein the notification comprises at least one of an audio notification and a visual notification, and wherein generating the notification comprises outputting the at least one of the audio notification and the visual notification.

Example 27: An apparatus according to any of Examples 14 to 26, comprising a mobile phone.

Example 28: At least one non-transitory computer-readable medium comprising instructions which, when executed by one or more processors, cause the one or more processors to perform a method according to any of Examples 1 to 13.

Example 29: An apparatus comprising means for performing a method according to any of Examples 1 to 13.

What is claimed is:

1. A method comprising:
    establishing a call between an endpoint and a remote device;
    determining the call is placed on hold by the remote device;
    monitoring, by the endpoint based on the call being placed on hold, the call for an indication of a call resume transition;
    sending, by the endpoint to the remote device, one or more messages comprising instructions prompting a call participant at the remote device to utter a particular keyword when resuming the call from a hold state, wherein the one or more messages are sent after the call is placed on hold by the remote device;
    detecting, by the endpoint, the indication of the call resume transition based on at least one utterance of the particular keyword by the call participant; and
    in response to detecting the indication of the call resume transition, generating, by the endpoint, a notification indicating that the hold has ended and the call has resumed.

2. The method of claim 1, further comprising:
    receiving, by the endpoint, an input requesting to initiate a hold monitoring mode at the endpoint;
    initiating, by the endpoint, the hold monitoring mode in response to the input; and
    monitoring, by the endpoint, the call during the hold monitoring mode for the indication of the call resume transition.

3. The method of claim 2, wherein the hold monitoring mode triggers the endpoint to monitor the call and generate the notification based on the detecting of the indication of the call resume transition.

4. The method of claim 1, further comprising:
    receiving, by the endpoint, a communication from the remote device, the communication comprising one or more utterances, wherein the communication is received after the call being placed on hold by the remote device;
    recognizing, by the endpoint using automatic speech processing, speech corresponding to the one or more utterances, the speech comprising one or more words; and
    detecting, by the endpoint, the particular keyword based on the recognized speech.

5. The method of claim 4, wherein the particular keyword comprises a predefined word identified as a call resume transition keyword, and wherein detecting the at least one of the particular keyword comprises determining that at least one of the one or more words matches the predefined word.

6. The method of claim 1, further comprising:
    detecting, by the endpoint, that the remote device has placed the call on hold based on at least one of an additional recognized keyword uttered by a first speaker at the remote device, a lack of communications received from the remote device for a period of time, or one or more utterances associated with a second speaker at the endpoint.

7. The method of claim 1, further comprising:
determining, by the endpoint, that a user associated with the endpoint has moved away from the endpoint;
determining, by the endpoint, that the user is within a proximity of a wireless device having at least one of audio capabilities or display capabilities; and
sending, by the endpoint to the wireless device, an instruction to output, via the at least one of the audio capabilities or the display capabilities, the notification indicating that the hold has ended and the call has resumed.

8. The method of claim 1, wherein the notification comprises at least one of an audio notification or a visual notification, and wherein generating the notification comprises outputting the at least one of the audio notification or the visual notification.

9. The method of claim 6, wherein the first speaker is the call participant.

10. The method of claim 7, wherein the user is the call participant.

11. An apparatus comprising:
one or more processors; and
at least one non-transitory computer-readable medium having stored therein instructions which, when executed by the one or more processors, cause the apparatus to:
establish a call with a remote device;
determine the call is placed on hold by the remote device;
monitor, based on the call being placed on hold, the call for an indication of a call resume transition;
send, to the remote device, one or more messages comprising instructions prompting a call participant at the remote device to utter a particular keyword when resuming the call from a hold state, wherein the one or more messages are sent after the call is placed on hold by the remote device;
detect the indication of the call resume transition based on at least one utterance of the particular keyword by the call participant; and
in response to detecting the indication of the call resume transition, generate a notification indicating that the hold has ended and the call has resumed.

12. The apparatus of claim 11, the at least one non-transitory computer-readable medium storing instructions which, when executed by the one or more processors, cause the apparatus to:
receive an input requesting to initiate a hold monitoring mode at the apparatus;
initiate the hold monitoring mode in response to the input; and
monitor the call during the hold monitoring mode for the indication of the call resume transition.

13. The apparatus of claim 12, wherein the hold monitoring mode triggers the apparatus to monitor the call and generate the notification based on the detecting of the indication of the call resume transition.

14. The apparatus of claim 11, the at least one non-transitory computer-readable medium storing instructions which, when executed by the one or more processors, cause the apparatus to:
receive a communication from the remote device, the communication comprising one or more utterances, wherein the communication is received after the call being placed on hold by the remote device;
recognize, using automatic speech processing, speech corresponding to the one or more utterances, the speech comprising one or more words; and
detect the particular keyword based on the recognized speech.

15. The apparatus of claim 14, wherein the particular keyword comprises a predefined word identified as a call resume transition keyword, and wherein detecting the at least one of the particular keyword comprises determining that at least one of the one or more words matches the predefined word.

16. The apparatus of claim 11, the at least one non-transitory computer-readable medium storing instructions which, when executed by the one or more processors, cause the apparatus to:
detect that the remote device has placed the call on hold based on at least one of an additional recognized keyword uttered by a first speaker at the remote device, a lack of communications received from the remote device for a period of time, or one or more utterances associated with a second speaker at the apparatus.

17. The apparatus of claim 11, the at least one non-transitory computer-readable medium storing instructions which, when executed by the one or more processors, cause the apparatus to:
determine that a user associated with the apparatus has moved away from the apparatus;
determine that the user is within a proximity of a wireless device having at least one of audio capabilities or display capabilities; and
send, to the wireless device, an instruction to output, via the at least one of the audio capabilities or the display capabilities, the notification indicating that the hold has ended and the call has resumed.

18. The apparatus of claim 11, wherein the notification comprises at least one of an audio notification or a visual notification, and wherein generating the notification comprises outputting the at least one of the audio notification or the visual notification.

19. The apparatus of claim 11, comprising a mobile phone.

20. The apparatus of claim 16, wherein the first speaker is the call participant.

21. The apparatus of claim 17, wherein the user is the call participant.

22. At least one non-transitory computer-readable medium comprising instructions which, when executed by one or more processors, cause the one or more processors to:
establish a call between an endpoint and a remote device;
determine the call is placed on hold by the remote device;
monitor, based on the call being placed on hold, the call for an indication of a call resume transition;
send, to the remote device, one or more messages comprising instructions prompting a call participant at the remote device to utter a particular keyword when resuming the call from a hold state, wherein the one or more messages are sent after the call is placed on hold by the remote device;
detect the indication of the call resume transition based on at least one utterance of the particular keyword by the call participant; and
in response to detecting the indication of the call resume transition, generate a notification indicating that the hold has ended and the call has resumed.

23. The at least one non-transitory computer-readable medium of claim 22, further comprising instructions which, when executed by one or more processors, cause the one or more processors to:
- receive, by the endpoint, a communication from the remote device, the communication comprising one or more utterances, wherein the communication is received after the call being placed on hold by the remote device;
- recognize, by the endpoint using automatic speech processing, speech corresponding to the one or more utterances, the speech comprising one or more words; and
- detect, by the endpoint, the particular keyword based on the recognized speech.

24. The at least one non-transitory computer-readable medium of claim 23, wherein the particular keyword comprises a predefined word identified as a call resume transition keyword, and wherein detecting the at least one of the particular keyword comprises determining that at least one of the one or more words matches the predefined word.

25. The at least one non-transitory computer-readable medium of claim 22, further comprising instructions which, when executed by one or more processors, cause the one or more processors to:
- receive an input requesting to initiate a hold monitoring mode at the endpoint;
- initiate the hold monitoring mode in response to the input; and
- monitor the call during the hold monitoring mode for the indication of the call resume transition.

26. The at least one non-transitory computer-readable medium of claim 25, wherein the hold monitoring mode triggers the endpoint to monitor the call and generate the notification based on the detecting of the indication of the call resume transition.

27. The at least one non-transitory computer-readable medium of claim 22, further comprising instructions which, when executed by one or more processors, cause the one or more processors to:
- detect that the remote device has placed the call on hold based on at least one of an additional recognized keyword uttered by a first speaker at the remote device, a lack of communications received from the remote device for a period of time, or one or more utterances associated with a second speaker at the endpoint.

28. The at least one non-transitory computer-readable medium of claim 27, wherein the first speaker is the call participant.

29. The at least one non-transitory computer-readable medium of claim 22, further comprising instructions which, when executed by one or more processors, cause the one or more processors to:
- determine that a user associated with the endpoint has moved away from the endpoint;
- determine that the user is within a proximity of a wireless device having at least one of audio capabilities or display capabilities; and
- send, to the wireless device, an instruction to output, via the at least one of the audio capabilities or the display capabilities, the notification indicating that the hold has ended and the call has resumed.

30. The at least one non-transitory computer-readable medium of claim 29, wherein the user is the call participant.

* * * * *